United States Patent
Jia et al.

(10) Patent No.: US 12,502,654 B2
(45) Date of Patent: Dec. 23, 2025

(54) HYDROGENATION CATALYST AND PREPARATION METHOD THEREFOR AND USE THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yanzi Jia, Beijing (CN); Hong Nie, Beijing (CN); Qinghe Yang, Beijing (CN); Shuangqin Zeng, Beijing (CN); Dawei Hu, Beijing (CN); Xinqiang Zhao, Beijing (CN); Zhonghuo Deng, Beijing (CN); Liang Ren, Beijing (CN); Xinpeng Nie, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 403 days.

(21) Appl. No.: 17/997,504

(22) PCT Filed: Apr. 28, 2021

(86) PCT No.: PCT/CN2021/090414
§ 371 (c)(1),
(2) Date: Oct. 28, 2022

(87) PCT Pub. No.: WO2021/218982
PCT Pub. Date: Nov. 4, 2021

(65) Prior Publication Data
US 2023/0211316 A1 Jul. 6, 2023

(30) Foreign Application Priority Data

Apr. 28, 2020 (CN) .......................... 202010351443.0
Apr. 28, 2020 (CN) .......................... 202010351482.0

(51) Int. Cl.
| | |
|---|---|
| *B01J 21/04* | (2006.01) |
| *B01J 6/00* | (2006.01) |
| *B01J 23/30* | (2006.01) |
| *B01J 23/755* | (2006.01) |
| *C10G 47/12* | (2006.01) |
(Continued)

(52) U.S. Cl.
CPC .............. *B01J 21/04* (2013.01); *B01J 6/001* (2013.01); *B01J 23/30* (2013.01); *B01J 23/755* (2013.01); *C10G 47/12* (2013.01); *B01J 35/50* (2024.01); *B01J 35/70* (2024.01); *B01J 2235/10* (2024.01); *B01J 2235/15* (2024.01)

(58) Field of Classification Search
CPC ...... B01J 6/001; B01J 21/04; B01J 23/30755; B01J 23/85; B01J 23/882; B01J 23/883; B01J 27/185; B01J 27/1853; B01J 27/188; B01J 27/19; B01J 35/394; B01J 35/50; B01J 35/55; B01J 35/70; B01J 35/77; B01J 37/0009; B01J 37/0018; B01J 37/0045; B01J 37/0201; B01J 37/0203; B01J 37/031; B01J 37/06; B01J 37/08; B01J 37/088; B01J 37/20; B01J 37/28; C10G 45/08; C10G 47/12; C10G 49/04; C10G 2300/107; C10G 2300/1074; C10G 2300/202; C10G 2300/205

See application file for complete search history.

(56) References Cited

U.S. PATENT DOCUMENTS

2011/0257008 A1* 10/2011 Bartholomew ........ C01G 25/02
423/592.1

FOREIGN PATENT DOCUMENTS

| CN | 102247882 A | 11/2011 |
|---|---|---|
| CN | 102764665 A | 11/2012 |

(Continued)

OTHER PUBLICATIONS

WIPO Machine Translation of CN102247882. (Year: 2011).*
(Continued)

*Primary Examiner* — Brian A Mccaig
(74) *Attorney, Agent, or Firm* — NKL Law; Allen Xue

(57) ABSTRACT

A catalyst has a carrier and a hydrogenation active metal component supported on the carrier. The hydrogenation active metal component contains at least one Group VIB metal component and at least one Group VIII metal component, and the carrier is composed of phosphorus-containing alumina. When the hydrogenation catalyst is measured using a hydrogen temperature programmed reduction method ($H_2$-TPR), the ratio of the peak height of the low-temperature reduction peak, $P_{low\text{-}temp\ peak}$, at a temperature of 300-500° C. to the peak height of the high-temperature reduction peak, $P_{hi\text{-}temp\ peak}$, at a temperature of 650-850° C., i.e. $S=P_{low\text{-}temp\ peak}/P_{hi\text{-}temp\ peak}$, is 0.5-2.0; preferably 0.7-1.9, and more preferably 0.8-1.8. The hydrogenation catalyst shows excellent heteroatom removal effect and excellent stability when used in hydrotreatment.

20 Claims, No Drawings

(51) Int. Cl.
    *B01J 35/50*    (2024.01)
    *B01J 35/70*    (2024.01)

(56) References Cited

FOREIGN PATENT DOCUMENTS

| | | | |
|---|---|---|---|
| CN | 103055908 | A | 4/2013 |
| CN | 103055944 | A | 4/2013 |
| CN | 106607068 | A | 5/2017 |
| CN | 108014830 | A | 5/2018 |
| CN | 110064403 | A | 7/2019 |
| CN | 110064405 | A | 7/2019 |
| KR | 20180111815 | A | 10/2018 |
| RU | 2264254 | C2 | 11/2005 |
| RU | 2608775 | C2 | 1/2017 |
| RU | 2640585 | C2 | 1/2018 |
| RU | 2700052 | C2 | 9/2019 |
| UA | 26317 | C2 | 8/1999 |
| WO | 1990013363 | A1 | 11/1990 |

OTHER PUBLICATIONS

Baker, B.R. et al, 1974, Journal of Catalysis, 33, 265-278. (Year: 1974).*
Al-Fatesh, A.S. et al., 2018, Journal of Saudi Chemical Society, 22, 239-247. <http://dx.doi.org/10.1016/j.jscs.2016.05.001> (Year: 2018).*
Li, Zhenhua; "Study of Catalytic Materials for Hydrotreating of Heavy oil"; College of Chemistry & Chemical Engineering China University of Petroleum(EastChina) Master Degree Thesis; Jun. 2010; pp. 1-102.
Yang, Cuiding et al.; "Petrochemical Analysis Method (RIPP Test Method)"; Science Press; Sep. 1990; RIPP133-90, pp. 376-379; ISBN : 7-03-001894-X.
Yang, Cuiding et al.; "Petrochemical Analysis Method (RIPP Test Method)"; Science Press; Sep. 1990; RIPP124-90, pp. 349-351.
Yang, Cuiding et al.; "Petrochemical Analysis Method (RIPP Test Method)"; Science Press; Sep. 1990; RIPP149-90, pp. 420.

* cited by examiner

HYDROGENATION CATALYST AND PREPARATION METHOD THEREFOR AND USE THEREOF

TECHNICAL FIELD

The present application relates to the field of hydrogenation catalysts, particularly to a hydrogenation catalyst, its preparation and application thereof.

BACKGROUND ART

With the deterioration of crude oil and the stricter requirements of environmental regulations on the quality of clean oil products, all-hydrogen refinery has become the development direction of refineries in the future. The hydrogenation technology can improve the adaptability of refineries for feedstock oils, adjust the product distribution, improve the yield of light oil products, produce clean products and realize clean production, and is the most flexible and green processing technology in oil refining process. Among them, the hydrogenation catalyst is the core of hydrogenation technology.

Hydrogenation catalysts are generally composed of a carrier and an active metal component. Metal deposition, carbon deposit, and accumulation of the active phase are three major factors that contribute to the deactivation of hydrogenation catalysts. The aggravation of the deterioration of refinery feedstocks and the continuous improvement of the quality requirements of oil products require that the hydrogenation catalyst has higher activity and excellent stability. How to provide excellent diffusion performance and metals uptake capacity for the catalyst, and reduce the damage, aggregation and poisoning of the catalyst active phase structure in the reaction process through optimized matching among the appearance, surface property, and pore structure of the carrier and the structure stability of catalyst active phase is a key technology for improving the catalyst activity and stability.

However, no technology has been disclosed so far, which can well meet the requirements of both catalyst activity and stability, and this seriously affects the practical industrial application effect of the catalyst.

DISCLOSURE OF THE INVENTION

An object of the present application is to provide a hydrogenation catalyst, its preparation and application thereof, which catalyst has good hydrogenation activity and high stability.

To achieve the above object, in an aspect, the present application provides a hydrogenation catalyst comprising a carrier and a hydrogenation active metal component supported on the carrier, the hydrogenation active metal component comprising at least one Group VIB metal component and at least one Group VIII metal component, the carrier being composed of phosphorus-containing alumina;
    when the hydrogenation catalyst is measured using a hydrogen temperature-programmed reduction method ($H_2$-TPR), the ratio of the peak height of the low-temperature reduction peak, $P_{low\text{-}temp\ peak}$, at a temperature of 300-500° C. to the peak height of the high-temperature reduction peak, $P_{hi\text{-}temp\ peak}$, at a temperature of 650-850° C., i.e. $S=P_{low\text{-}temp\ peak}/P_{hi\text{-}temp\ peak}$, is 0.5-2.0; preferably 0.7-1.9, and more preferably 0.8-1.8.

In another aspect, the present application provides a phosphorus-containing pseudo-boehmite, comprising 94-99 wt %, preferably 95-98 wt %, of $Al_2O_3$ and 1-6 wt %, preferably 2-5 wt %, of $P_2O_5$, calculated as oxides and based on the dry weight of the phosphorus-containing pseudo-boehmite, wherein the phosphorus-containing pseudo-boehmite has an h value satisfying $1.7 \leq h \leq 3$, wherein $h=D(031)/D(020)$, the $D(031)$ represents a grain size of the crystal face represented by a (031) peak in the XRD pattern of the grain of the pseudo-boehmite, the $D(020)$ represents a grain size of the crystal face represented by a (020) peak in the XRD pattern of the grain of the pseudo-boehmite, the (031) peak refers to a peak at a $2\theta$ of 34-43° in the XRD pattern, and the (020) peak refers to a peak at a $2\theta$ of 10-15° in the XRD pattern, $D=K\lambda/(B \cos \theta)$, wherein K is the Scherrer constant, $\lambda$ is the diffraction wavelength of the target material, B is the half-peak width of the diffraction peak, and $2\theta$ is the position of the diffraction peak; more preferably, the pseudo-boehmite has an h value satisfying $1.9 \leq h \leq 3$, preferably satisfying $2.2 \leq h \leq 2.8$.

In another aspect, the present application provides a method for preparing a phosphorus-containing pseudo-boehmite, comprising the steps of:
1) contacting a solution of an inorganic aluminum-containing compound with an acid or alkali for precipitation reaction, or contacting an organic aluminum-containing compound with water for hydrolysis reaction, in the presence of a grain growth regulator and a phosphorus-containing compound, at a pH of 4-7, preferably 4-6.5, to obtain a phosphorus-containing hydrated alumina; and
2) subjecting the phosphorus-containing hydrated alumina obtained to aging at a pH of 7-10.5, preferably 8-10, to obtain the phosphorus-containing pseudo-boehmite.

In another aspect, the present application provides a method for preparing a hydrogenation catalyst, comprising the steps of:
i) providing a phosphorus-containing pseudo-boehmite, preferably the phosphorus-containing pseudo-boehmite is the phosphorus-containing pseudo-boehmite according to the present application or the phosphorus-containing pseudo-boehmite obtained by the method according to the present application;
ii) loading a hydrogenation active metal component on the phosphorus-containing pseudo-boehmite to obtain a hydrogenation catalyst precursor, wherein the hydrogenation active metal component comprises at least one Group VIB metal component and at least one Group VIII metal component; and
iii) calcining the hydrogenation catalyst precursor to obtain the hydrogenation catalyst, wherein the calcining conditions include: a calcining temperature of 560-800° C., and a calcining time of 1-10 hours.

In still another aspect, the present application provides the use of the hydrogenation catalyst according to the present application or the hydrogenation catalyst obtained by the method according to the present application in the hydrogenation reaction of hydrocarbon oils.

Compared with the prior art, the hydrogenation catalyst according to the present application has an excellent heteroatom removal effect and an excellent stability when used in hydrogenation treatment. Meanwhile, in the method for preparing the hydrogenation catalyst according to the present application, by loading a hydrogenation active metal component on a phosphorus-containing pseudo-boehmite having an h value satisfying $1.7 \leq h \leq 3$, and calcining the resulting hydrogenation catalyst precursor at a high temperature of 560-800° C., a hydrogenation catalyst with both a good hydrogenation activity and a high stability can be obtained.

DETAILED DESCRIPTION OF THE INVENTION

The present application will be further described hereinafter in detail with reference to specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the element distribution in the carrier particles is analyzed using the SEM-EDX (Scanning Electron Microscope-Energy Dispersive Spectrometry) method. Since the value of the element content of each point along the radial direction of the carrier in the SEM-EDX characterization result and the real element content of said point are corresponding to each other, the value can reflect the relative level of the element content of the point, though the numerical value may not represent the real element content of the point. Thus, in order to express the distribution of the hydrogenation active metal component along the radial direction of the carrier, a distribution factor σ is introduced, which is defined as the ratio of the content (also referred to as concentration) of the hydrogenation active metal component at a certain position of a particle to the content at the center thereof. The content of the hydrogenation active metal component at a certain position refers to the average value of the counts at 20 numerical points near the position (with a positional deviation≤20 nm) in the SEM-EDX characterization result; and the content of the hydrogenation active metal component at the center refers to the average value of the counts at 20 numerical points near the center point (with a positional deviation≤20 nm). If σ>1, it indicates that the content of hydrogenation active metal component at the point is higher than that at the center of the carrier particle; if σ=1, it indicates that the content of hydrogenation active metal component at the point is the same as that at the center of the carrier particle; and if σ<1, it indicates that the content of hydrogenation active metal component at the point is smaller than that at the center of the carrier particle. For example, in $\sigma_{VIB}(R)$, R refers to the particle radius, starting from the center of the carrier particle, VIB refers to the Group VIB metal component calculated as elements, and particularly, $\sigma_{VIB}(R)$ refers to the ratio of the content of Group VIB metal component at a position with a distance R from the center of the carrier to the content of Group VIB metal component at the center of the carrier.

In the present application, unless otherwise specified, the amount of the grain growth regulator used is calculated based on the weight of the inorganic aluminum-containing compound calculated as alumina in the precipitation reaction, and is calculated based on the weight of the organic aluminum-containing compound calculated as alumina in the hydrolysis reaction.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

As mentioned above, in a first aspect, the present application provides a hydrogenation catalyst comprising a carrier and a hydrogenation active metal component supported on the carrier, the hydrogenation active metal component comprising at least one Group VIB metal component and at least one Group VIII metal component, the carrier being composed of phosphorus-containing alumina;

when the hydrogenation catalyst is measured using a hydrogen temperature programmed reduction method ($H_2$-TPR), the ratio of the peak height of the low-temperature reduction peak, $P_{low\text{-}temp\ peak}$, at a temperature of 300-500° C. to the peak height of the high-temperature reduction peak, $P_{hi\text{-}temp\ peak}$, at a temperature of 650-850° C., i.e. $S = P_{low\text{-}temp\ peak} / P_{hi\text{-}temp\ peak}$, is 0.5-2.0; preferably 0.7-1.9, and more preferably 0.8-1.8.

The inventors of the present application have found that, by loading a specific hydrogenation active metal component on a phosphorus-containing alumina containing phosphorus element to provide a catalyst with a ratio S of 0.5-2.0, the catalyst may have a better initial activity and a better stability of activity, with the ratio S preferably being 0.8-1.8. When the ratio S is lower than 1, the initial activity is too low, which may affect the normal use of the catalyst; when the ratio S is higher than 2.0, the improvement in stability is not significant.

In a preferred embodiment, the hydrogenation catalyst has a distribution factor $\sigma_{VIB}(R)$ of the Group VIB metal component of 0.5-3.5, more preferably 0.8-3, particularly preferably 1-2.6, most preferably 1-1.05; and a distribution factor $\sigma_{VIII}(R)$ of the Group VIII metal component of 0.5-3.5, more preferably 0.8-3, and particularly preferably 0.98-1.19. In the preferred embodiment, the distribution of the hydrogenation active metal component in the hydrogenation catalyst along the radial direction of the carrier is more uniform, which is more beneficial to improving the hydrogenation activity for demetallization, denitrification and carbon residue removal.

In the present application, the Group VIB metal component and the Group VIII metal component are not particularly limited, as long as the hydrogenation activity and stability of the hydrogenation catalyst can be improved;

preferably, the Group VIB metal component is Mo and/or W and the Group VIII metal component is Co and/or Ni.

In the present application, the amounts of the Group VIB metal component and the Group VIII metal component may vary within a wide range. Preferably, based on the total amount of the hydrogenation catalyst, the content of the carrier is 30-99 wt %, and, calculated as oxides, the content of the Group VIB metal component is 0.5-50 wt %, and the content of the Group VIII metal component is 0.5-20 wt %; further preferably, based on the total amount of the hydrogenation catalyst, the content of the carrier is 40-94 wt %, and, calculated as oxides, the content of the Group VIB metal component is 5-45 wt % and the content of the Group VIII metal component is 1-15 wt %. Particularly preferably, based on the total amount of the hydrogenation catalyst, the content of the carrier is 64-86 wt %, and, calculated as oxides, the content of the Group VIB metal component is 12-30 wt %, and the content of the Group VIII metal component is 2-6 wt %.

In a preferred embodiment, calculated as oxides and based on the weight of the carrier, the carrier of the hydrogenation catalyst of the present application has an $Al_2O_3$ content of 94-99 wt %, preferably 95-98 wt %; and a $P_2O_5$ content of 1-6 wt %, preferably 2-5 wt %.

In a preferred embodiment, the phosphorus-containing alumina has a specific surface distribution of hydroxyl group and the phosphorus-containing alumina shows an IR spectrum in which $(I_{3670}+I_{3580})/(I_{3770}+I_{3720})$ is in a range of 1.9 to 2.8, preferably 2 to 2.7; wherein 13670 represents the height of the peak at 3670 $cm^{-1}$, $I_{3580}$ represents the height of the peak at 3580 $cm^{-1}$, $I_{3770}$ represents the height of the peak at 3770 $cm^{-1}$, and $I_{3720}$ represents the height of the peak at 3720 $cm^{-1}$. The phosphorus-containing alumina having a value of $(I_{3670}+I_{3580})/(I_{3770}+I_{3720})$ satisfying the above specification shows a specific distribution of hydroxyl group, and is more advantageous for improving the hydrogenation activity of a hydrogenation catalyst comprising the phosphorus-containing alumina as a carrier. Typically, existing alumina carriers have a $(I_{3670}+I_{3580})/(I_{3770}+I_{3720})$ value lower than 1.8.

According to the present application, the phosphorus-containing alumina can be obtained by calcining the phosphorus-containing pseudo-boehmite, and preferably the calcining conditions include: a calcining temperature of 560-800° C.; a calcining time of 1-10 hours; and the heating rate of the calcining is 50-600° C./hour.

In a preferred embodiment, the phosphorus-containing pseudo-boehmite has an h value satisfying 1.7≤h≤3, preferably 1.9≤h≤3, more preferably 2.2≤h≤2.8, wherein h=D(031)/D(020), the D(031) represents a grain size of the crystal face represented by a (031) peak in the XRD pattern of the grain of the pseudo-boehmite, the D(020) represents a grain size of the crystal face represented by a (020) peak in the XRD pattern of the grain of the pseudo-boehmite, the (031) peak refers to a peak at a 2θ of 34-43° in the XRD pattern, and the (020) peak refers to a peak at a 2θ of 10-15° in the XRD pattern, D=Kλ/(B cos θ), wherein K is the Scherrer constant, λ is the diffraction wavelength of the target material, B is the half-peak width of the diffraction peak, and 2θ is the position of the diffraction peak.

The hydrogenation catalyst of the present application may further comprise any auxiliary agent that does not affect the performance of the hydrogenation catalyst of the present application or can improve the performance of the hydrogenation catalyst of the present application, for example, may further comprise at least one selected from the group consisting of Group IA, Group IIA, Group IIIA, Group IVA, Group VA, Group VIIA, Group IIB, Group IIIB, Group IVB elements and rare earth metal elements, preferably at least one selected from the group consisting of boron, fluorine, silicon, sodium, magnesium, lithium, zinc, calcium, potassium, titanium, lanthanum and cerium, and the content of the auxiliary agent, calculated as elements, is not more than 10 wt %, preferably 0.5-6 wt %, based on the catalyst.

Compared with existing hydrogenation catalysts, the hydrogenation catalyst according to the present application shows good comprehensive performance in hydrogenation activity and stability. The hydrogenation catalyst of the present application can be used alone or in combination with other catalysts when used in hydrogenation reaction of hydrocarbon oils.

In a second aspect, the present application provides a phosphorus-containing pseudo-boehmite, comprising 94-99 wt %, preferably 95-98 wt %, of $Al_2O_3$ and 1-6 wt %, preferably 2-5 wt %, of $P_2O_5$, calculated as oxides and based on the dry weight of the phosphorus-containing pseudo-boehmite, wherein the phosphorus-containing pseudo-boehmite has an h value satisfying 1.7≤h≤3, wherein h=D(031)/D(020), the D(031) represents a grain size of the crystal face represented by a (031) peak in the XRD pattern of the grain of the pseudo-boehmite, the D(020) represents a grain size of the crystal face represented by a (020) peak in the XRD pattern of the grain of the pseudo-boehmite, the (031) peak refers to a peak at a 2θ of 34-43° in the XRD pattern, and the (020) peak refers to a peak at a 2θ of 10-15° in the XRD pattern, D=Kλ/(B cos θ), wherein K is the Scherrer constant, λ is the diffraction wavelength of the target material, B is the half-peak width of the diffraction peak, and 2θ is the position of the diffraction peak.

The phosphorus-containing alumina prepared by calcining the phosphorus-containing pseudo-boehmite has a specific distribution of hydroxyl group, and is more beneficial to improving the hydrogenation activity of a hydrogenation catalyst comprising the phosphorus-containing alumina as a carrier. Typically, pseudo-boehmite obtained in prior arts has an h value of 0.85-1.65.

In the present application, for different diffraction peaks, both B and 2θ take the value of corresponding peaks, for example, when calculating D(031), D(031)=Kλ/(B cos θ), wherein B is the half-width of the 031 diffraction peak and 2θ is the position of the 031 diffraction peak; when calculating D(020), D(020)=Kλ/(B cos θ), wherein B is the half-width of the 020 diffraction peak and 2θ is the position of the 020 diffraction peak.

In a preferred embodiment, the phosphorus-containing pseudo-boehmite has an h value satisfying 1.9≤h≤3, more preferably satisfying 2.2≤h≤2.8. Within the preferable range, the hydrogenation catalyst comprising the phosphorus-containing alumina obtained by calcining the phosphorus-containing pseudo-boehmite as a carrier shows a better hydrogenation activity.

According to the present application, the phosphorus-containing pseudo-boehmite has a relative crystallinity (based on commercial SB powder from Condea Chemie GmbH) typically in a range of 45-77%, preferably in a range of 65-77%.

The phosphorus-containing pseudo-boehmite according to the present application comprises phosphorus and has a specific crystal structure, so that a hydrogenation catalyst prepared by using a carrier prepared from the phosphorus-containing pseudo-boehmite and a hydrogenation active metal component loaded on the carrier shows an excellent hydrogenation activity and reaction stability.

In a third aspect, the present application provides a method for preparing a phosphorus-containing pseudo-boehmite, comprising the steps of:

1) contacting a solution of an inorganic aluminum-containing compound with an acid or alkali for precipitation reaction, or contacting an organic aluminum-containing compound with water for hydrolysis reaction, in the presence of a grain growth regulator and a phosphorus-containing compound, at a pH of 4-7, preferably 4-6.5, to obtain a phosphorus-containing hydrated alumina; and 2) subjecting the phosphorus-containing hydrated alumina obtained to aging at a pH of 7-10.5, preferably 8-10, to obtain the phosphorus-containing pseudo-boehmite.

The inventors of the present application found during research that a phosphorus-containing pseudo-boehmite having a specific distribution structure of hydroxyl group can be prepared by enhancing the adjustment of the growth manner of crystal grain by adding a phosphorus-containing compound to the starting material, adding a grain growth regulator during the precipitation reaction or hydrolysis reaction, controlling the pH of the precipitation reaction or hydrolysis reaction to 4-7, and then adjusting the pH to 7-10.5 for aging.

Without being bound to a particular theory, it is believed that the precipitation reaction or hydrolysis reaction carried out in the presence of the grain growth regulator and the phosphorus-containing compound is beneficial to the regulation of the growth rate of the grains in the (020) crystal face and the (031) crystal face, so that the resulting phosphorus-containing pseudo-boehmite has an h value satisfying $1.7 \leq h \leq 3$, preferably $1.9 \leq h \leq 3$, more preferably $2.2 \leq h \leq 2.8$, wherein h is defined as above. The grain growth regulator and the phosphorus-containing compound are added into the starting materials of the precipitation reaction or the hydrolysis reaction or during the reaction process, so that the subsequent aging reaction is also carried out in the presence of the grain growth regulator and the phosphorus-containing compound, and therefore, no additional grain growth regulator and phosphorus-containing compound is needed to be added during the aging process.

According to the present application, the precipitation reaction or hydrolysis reaction is carried out in the presence of a grain growth regulator and a phosphorus-containing compound at a pH of 4-7, so that the precipitation of a phosphorus-containing hydrated alumina can be achieved, a low pH condition can be kept, the excessive growth of pseudo-boehmite grains at a high pH can be avoided, and the joint regulation effect of phosphorus and the growth regulator on the growth of the pseudo-boehmite can be enhanced. The generation and aging of hydrated alumina, and the growth of the grains of pseudo-boehmite are all carried out in the presence of the phosphorus compound and the crystal grain regulator, so that the resulting pseudo-boehmite has a special crystal structure and is especially suitable for use as a carrier precursor of heavy oil hydrogenating catalyst.

In a particular embodiment, step 1) further comprises: contacting a solution of an inorganic aluminum-containing compound, a phosphorus-containing compound, a grain growth regulator and acid or alkali to carry out a precipitation reaction, or carrying out a hydrolysis reaction on an organic aluminum-containing compound, a phosphorus-containing compound, a grain growth regulator and water; and controlling the pH of the precipitation reaction or the hydrolysis reaction to 4-7.

In a preferred embodiment, the precipitation reaction or hydrolysis reaction of step 1) is carried out at a pH of 4-6.5. Carrying out the precipitation reaction or hydrolysis reaction at the preferable pH is beneficial to the improvement of the hydrogenation activity of the hydrogenation catalyst prepared from the resulting phosphorus-containing pseudo-boehmite in the hydrogenation of heavy oils.

The conditions other than pH are not particularly limited herein for the precipitation reaction and hydrolysis reaction. Preferably, the temperatures of the precipitation reaction and the hydrolysis reaction are each independently 30-90° C.

In a preferred embodiment, the conditions of the precipitation reaction include: a reaction temperature of 40-90° C., and a reaction time of 10-60 minutes. Further preferably, the conditions of the precipitation reaction include: a reaction temperature of 45-80° C., and a reaction time of 10-30 minutes.

The amount of water used during the hydrolysis reaction can be selected within wide limits, provided that the molar ratio of water to organic aluminum-containing compound is greater than the stoichiometric ratio. In a preferred embodiment, the conditions of the hydrolysis reaction include: a reaction temperature of 40-90° C., preferably 45-80° C., and a reaction time of 2-30 hr, preferably 2-20 hr.

In the present application, the grain growth regulator is a substance capable of regulating the growth rate of the pseudo-boehmite grains on different crystal faces, preferably a substance capable of regulating the growth rate of the grains on the (020) crystal face and the (031) crystal face, and for example, may be any of various substances showing a strong adsorptive action with hydrated alumina. In a preferred embodiment, the grain growth regulator may be at least one selected from the group consisting of polyhydric sugar alcohols, salts of corresponding carboxylic acids thereof, and sulfates; further preferably, the grain growth regulator may be selected from the group consisting of sorbitol, glucose, gluconic acid, gluconate, ribitol, ribonic acid, salt of ribonic acid, sulfate, or any combination thereof. The gluconate, the salt of ribonic acid and the sulfate may respectively be soluble salts thereof, for example, one or more of potassium salt, sodium salt and lithium salt.

The manner for the addition of the grain growth regulator is not particularly limited, and the grain growth regulator can be added alone, or the grain growth regulator can be mixed with one or more starting materials in advance, and then the starting materials comprising the grain growth regulator are reacted.

The amount of the grain growth regulator is not particularly limited in the present application. In some preferred embodiments, the grain growth regulator is used in the precipitation reaction in an amount of 1-10 wt %, preferably 1.5-8.5 wt %, and more preferably 2-6 wt %, calculated as alumina and based on the weight of the inorganic aluminum-containing compound. In other preferred embodiments, the grain growth regulator is used in the hydrolysis reaction in an amount of 1-10 wt %, preferably 1.5-8.5 wt %, and more preferably 2-6 wt %, calculated as alumina and based on the weight of the organic aluminum-containing compound.

In the present application, the manner for the addition of the phosphorus-containing compound is not particularly limited, and the phosphorus-containing compound (or the aqueous solution of the phosphorus-containing compound) may be added alone, or the phosphorus-containing compound (or the aqueous solution thereof) may be mixed with one or more starting materials in advance, and then the starting materials comprising the phosphorus-containing compound may be reacted, as long as the precipitation reaction or hydrolysis reaction is carried out in the presence of the phosphorus-containing compound. In the method according to the present application, the phosphorus-containing compound has a regulating effect on the growth of the grain of the pseudo-boehmite.

In the present application, the phosphorus-containing compound may be selected within a wide range, and may be, for example, a water-soluble inorganic phosphorus-containing compound. In a preferred embodiment, the phosphorus-containing compound is at least one selected from the group consisting of phosphoric acid, ammonium phosphate, ammonium hydrogen phosphate, diammonium hydrogen phosphate, sodium phosphate, and potassium phosphate.

In order to exert the regulating effect of the phosphorus-containing compound on the growth of the grain of the pseudo-boehmite in a better way, it is preferable that the phosphorus-containing compound is used in such an amount that, in the resulting phosphorus-containing pseudo-boehmite, $P_2O_5$ is present in an amount of 1-6 wt %, preferably 2-5 wt %, calculated as oxides and based on the dry weight of the phosphorus-containing pseudo-boehmite. In the present application, unless otherwise specified, the dry weight of the phosphorus-containing pseudo-boehmite means the weight of the phosphorus-containing pseudo-boehmite measured after calcining at 600° C. for 4 hours.

According to the present application, the inorganic aluminum-containing compound used in step 1) is preferably an aluminum salt and/or an aluminate. Correspondingly, the inorganic aluminum-containing compound can also be various aluminum salt solutions and/or aluminate solutions, and the aluminum salt solution can be various aluminum salt solutions, such as an aqueous solution of one or more of aluminum sulfate, aluminum chloride and aluminum nitrate. Due to their low price, aluminum sulfate solution and/or aluminum chloride solution are preferred. The aluminum salt may be used alone or in combination of two or more thereof. The aluminate solution may be any aluminate solution, such as sodium aluminate solution and/or potassium aluminate solution. Sodium aluminate solution is preferred because of its availability and low cost. The aluminate solution may also be used alone or in a mixture. The concentration of the inorganic aluminum-containing compound solution is not particularly limited, and preferably, the concentration of the inorganic aluminum-containing compound solution is 20-200 g/l calculated as alumina.

According to the present application, the organic aluminum-containing compound used in step 1) may be at least one of various aluminum alkoxides that can undergo a hydrolysis reaction with water to produce a precipitate of hydrated alumina, and may be, for example, at least one of aluminum isopropoxide, aluminum isobutoxide, aluminum triisopropoxide, aluminum tri-tert-butoxide, and aluminum isooctanolate.

According to the present application, the acid used in step 1) may be various protonic acids or oxides that are acidic in an aqueous medium, and for example, may be at least one of sulfuric acid, hydrochloric acid, nitric acid, carbonic acid, phosphoric acid, formic acid, acetic acid, citric acid, and oxalic acid, and preferably, the protonic acid is at least one selected from the group consisting of nitric acid, sulfuric acid, and hydrochloric acid. The carbonic acid may be generated in situ by passing carbon dioxide into the aluminum salt solution and/or the aluminate solution. The acid may be introduced in the form of a solution, and the concentration of the acid solution is not particularly limited, but it is preferable that the concentration of $H^+$ is 0.2-2 mol/l.

According to the present application, the alkali used in step 1) can be a hydroxide or a salt that can be hydrolyzed in an aqueous medium to make the aqueous solution alkaline, preferably, the hydroxide is at least one selected from the group consisting of ammonia, sodium hydroxide and potassium hydroxide; preferably, the salt is at least one selected from the group consisting of sodium metaaluminate, potassium metaaluminate, ammonium bicarbonate, ammonium carbonate, sodium bicarbonate, sodium carbonate, potassium bicarbonate and potassium carbonate. The alkali may be introduced in the form of a solution, and the concentration of the alkali solution is not particularly limited, but it is preferable that the concentration of $OH^-$ is 0.2-4 mol/l. When sodium metaaluminate and/or potassium metaaluminate is used as the alkali, the amounts of the grain growth regulator and the phosphorus-containing compound are calculated taking into account of the corresponding amounts of alumina in the sodium metaaluminate and/or potassium metaaluminate.

In some preferred embodiments, in order to control the pH of the hydrolysis reaction of step 1), an acid or an alkali may also be introduced into the hydrolysis reaction, and the manner for addition and the kind of the acid or the alkali may be as described above, of which the detailed description is omitted herein for brevity.

In addition, the method for precipitating aluminum by controlling the pH of the reactants through the amount of alkali or acid is well known to those skilled in the art, of which the detailed description is omitted herein for brevity.

According to the present application, said aging of step 2) is carried out at a pH of 7-10.5. Since the precipitation reaction or hydrolysis reaction of step 1) is carried out at a pH of 4-7, it is preferable to introduce an alkali to adjust the pH of the aging reaction before the aging is carried out. The alkali may be introduced in the form of a solution, and the concentration of the alkali solution is not particularly limited, but it is preferable that the concentration of $OH^-$ is 0.2-4 mol/l. In a preferred embodiment, said aging of step 2) is carried out at a pH of 8-10.

Besides the pH, other conditions of said aging of step 2) may be selected within a wide range. In a preferred embodiment, the temperature of the aging is 50-95° C., preferably 55-90° C. The aging time may be appropriately selected depending on the aging temperature, and preferably, the aging time is 0.5-8 hours, more preferably 2-6 hours.

In a preferred embodiment, the method of the present application further comprises, after the aging reaction, separating, washing and optionally drying the aged product. According to the method of the present application, the separation may be carried out by various means well known in the art, such as filtration or centrifugation. The washing and drying method may be those commonly used in the preparation of pseudo-boehmite, for example, the washing agent may be water, and the drying may be at least one of oven drying, air-blast drying, spray drying, and flash drying. The drying temperature may be 100-350° C., preferably 120-300° C.

In a particularly preferred embodiment, the method for preparing the phosphorus-containing pseudo-boehmite of the present application comprises the steps of:

1) adding an inorganic aluminum-containing compound solution comprising a phosphorus-containing compound and a grain growth regulator and an alkali solution or an acid solution into a reaction container in a concurrent flow or intermittent mode for precipitation reaction to obtain a phosphorus-containing hydrated alumina slurry; or, adding a phosphorus-containing compound and a grain growth regulator into deionized water to perform hydrolysis reaction with aluminum alkoxide to obtain a phosphorus-containing hydrated alumina slurry, and performing precipitation reaction or hydrolysis reaction at a pH of 4-7, preferably 4-6.5, by using the amount of an acid solution or an alkali solution;

2) adding an alkaline solution into the phosphorus-containing hydrated alumina slurry obtained in step 1) to adjust the pH to 7-10.5, aging the resultant at 50-95° C. for 0.5-8 hours, and then filtering, washing and drying to obtain the phosphorus-containing pseudo-boehmite.

In a fourth aspect, the present application provides a method for preparing a hydrogenation catalyst, comprising the steps of:

i) providing a phosphorus-containing pseudo-boehmite, preferably the phosphorus-containing pseudo-boehmite is the phosphorus-containing pseudo-boehmite according to the present application or the phosphorus-containing pseudo-boehmite obtained by the method according to the present application;

ii) loading a hydrogenation active metal component on the phosphorus-containing pseudo-boehmite to obtain a hydrogenation catalyst precursor, wherein the hydrogenation active metal component comprises at least one Group VIB metal component and at least one Group VIII metal component; and iii) calcining the hydrogenation catalyst precursor to obtain the hydrogenation catalyst, wherein the calcining conditions include: a calcining temperature of 560-800° C., and a calcining time of 1-10 hours.

The inventors of the present application found during the research that a hydrogenation catalyst having both a good hydrogenation activity and a high stability can be obtained by loading a hydrogenation active metal component on the phosphorus-containing pseudo-boehmite according to the present application and then calcining the resulting hydrogenation catalyst precursor at a high temperature of 560-800° C. for 1-10 hours, preferably 3-6 hours, during the preparation of the hydrogenation catalyst. In a further preferred embodiment, the calcining temperature of step iii) is 610-780° C., more preferably 630-750° C., and most preferably 650-730° C.

In the present application, the calcining of step iii) may be carried out in a conventional manner in the art, and the calcining may be carried out by heating from ambient temperature to the calcining temperature, or directly from the temperature of the drying following the impregnation of the metal component to the calcining temperature, which is not particularly limited in the present application. For example, the heating rate during the calcining may be 50-600° C. per hour, preferably 100-550° C. per hour.

In a preferred embodiment of the method according to the present application, the Group VIB metal component is Mo and/or W and the Group VIII metal component is Co and/or Ni.

The amounts of the Group VIB metal component and the Group VIII metal component may vary within a wide range according to the present application. Preferably, the Group VIB metal component and the Group VIII metal component are used in such amounts that the resulting hydrogenation catalyst comprises 30-99 wt % of a carrier, 0.5-50 wt % of the Group VIB metal component and 0.5-20 wt % of the Group VIII metal component, calculated as oxides, based on the total amount of the hydrogenation catalyst.

Further preferably, the hydrogenation active metal component is used in such an amount that, in the resulting hydrogenation catalyst, the content of the carrier is 40-94 wt %, and, calculated as oxides, the content of the Group VIB metal component is 5-45 wt % and the content of the Group VIII metal component is 1-15 wt %, based on the total amount of the hydrogenation catalyst. More preferably, the content of the carrier is 64-86 wt %, and, calculated as oxide, the content of the Group VIB metal component is 12-30 wt %, and the content of the Group VIII metal component is 2-6 wt %, based on the total amount of the hydrogenation catalyst.

A first type of preferred embodiments of the method for preparing hydrogenation catalyst according to the present application:

In the first type of preferred embodiments of the method according to the present application, said step ii) further comprises:

A) shaping and drying the phosphorus-containing pseudo-boehmite to obtain a shaped product, wherein no calcining is carried out after the drying; and B) loading a hydrogenation active metal component on the shaped product obtained in the step A), and optionally drying, to obtain the hydrogenation catalyst precursor.

In the present application, the drying in the step A) is not particularly limited and may be performed in a conventional manner in the art. In a preferred embodiment, the drying conditions of step A) include: a drying temperature of 40-350° C., preferably 100-200° C.; a drying time of 1-24 hours, preferably 2-12 hours.

According to the present application, in the step A), no calcining is carried out after the drying, so that calcining is carried out only once in the method according to the present application, by which the production yield of the catalyst can be improved and the production cost can be reduced while improving the stability of activity of the catalyst, and the operation is simpler and more convenient.

According to the present application, the method for loading the hydrogenation active metal component on the shaped product in step B) is not particularly limited, and may be any method conventionally used in the art, and may be, for example, an impregnation method. In a preferred embodiment, the step B) comprises impregnating the shaped product with an impregnating solution comprising at least one Group VIB metal compound and at least one Group VIII metal compound, and then drying, to obtain the hydrogenation catalyst precursor.

In a preferred embodiment, the Group VIB metal compound and the Group VIII metal compound used in step B) are each independently at least one selected from the group consisting of their soluble compounds (including the corresponding metal compounds soluble in water in the presence of a co-solvent). Particularly, the Group VIB metal compound, taking molybdenum as an example, may be selected from salts and/or oxides comprising molybdenum, for example, may be at least one selected from the group consisting of molybdenum oxide, molybdate, paramolybdate, and phosphomolybdate, and preferably is at least one selected from the group consisting of molybdenum oxide, ammonium molybdate, ammonium paramolybdate, and phosphomolybdic acid; the Group VIII metal compound, taking cobalt as an example, may be at least one selected from the group consisting of cobalt nitrate, cobalt acetate, basic cobalt carbonate, cobalt chloride, and cobalt oxide, preferably cobalt nitrate and/or basic cobalt carbonate, and taking nickel as an example, may be at least one selected from the group consisting of salts, oxides, and hydroxides comprising nickel, for example, may be at least one selected from the group consisting of nitrate, chloride, formate, acetate, phosphate, citrate, oxalate, carbonate, basic carbonate, hydroxide, phosphide, sulfide, and oxide of nickel, preferably at least one selected from the group consisting of oxalate, carbonate, basic carbonate, hydroxide, phosphate, and oxide of nickel, and more preferably at least one selected from the group consisting of nickel oxide, nickel nitrate, nickel acetate, basic nickel carbonate, nickel chloride, and nickel carbonate.

According to the present application, there is no particular limitation to the drying conditions used in step B). Preferably, the drying conditions include: a drying temperature of 50-350° C., and a drying time of 1-12 hr; preferably a drying temperature of 80-250° C., and a drying time of 2-8 hr. The manner of the drying is not particularly limited herein, and the drying may be at least one selected from oven drying, air-blast drying, spray drying, and flash drying. The drying atmosphere is not particularly limited in the present application, and may be at least one selected from air, oxygen and nitrogen, and is preferably air.

In a particularly preferred embodiment, the method for preparing the hydrogenation catalyst according to the present application comprises the steps of:
  i) adding an inorganic aluminum-containing compound solution comprising a phosphorus-containing compound and a grain growth regulator and an alkali solution or an acid solution into a reaction container in a concurrent flow or intermittent mode for precipitation reaction to obtain a phosphorus-containing hydrated alumina slurry; or, adding a phosphorus-containing compound and a grain growth regulator into deionized water to perform hydrolysis reaction with aluminum alkoxide to obtain a phosphorus-containing hydrated alumina slurry, and adjusting the amount of the acid solution or the alkali solution used to perform the precipitation reaction or hydrolysis reaction at a pH of 4-7, preferably 4-6.5; adding an alkaline solution into the resulting phosphorus-containing hydrated alumina slurry to adjust the pH to 7-10.5, aging at 50-95° C. for 0.5-8 hours, and then filtering, washing and drying to obtain the phosphorus-containing pseudo-boehmite;
  ii) shaping the phosphor-containing pseudo-boehmite obtained in the step i) by screw extrusion, drying at a temperature of 40-350° C. for 1-24 hours to obtain a shaped product, then impregnating the shaped product with an impregnating solution comprising at least one Group VIB metal compound and at least one Group VIII metal compound, and then drying at a temperature of 80-200° C. for 1-8 hours;
  iii) calcining the solid product obtained in the step ii) at a temperature of 560-800° C. for 1-10 hours to obtain the hydrogenation catalyst.

A second type of preferred embodiments of the method for preparing the hydrogenation catalyst according to the present application:

In a second type of preferred embodiments of the method according to the present application, the step ii) further comprises: mixing the phosphorus-containing pseudo-boehmite with a precursor of the hydrogenation active metal component, shaping and drying, to obtain the hydrogenation catalyst precursor.

According to the present application, the precursor of the hydrogenation active metal component comprises at least one precursor of Group VIB metal component and at least one precursor of Group VIII metal component. The form of the precursor of the hydrogenation active metal component is not particularly limited herein, as long as the hydrogenation active metal component can be loaded on the pseudo-boehmite; for example, it may be solid powders of the precursor of hydrogenation active metal component or a solution of the precursor of hydrogenation active metal component.

In the present application, the precursor of the hydrogenation active metal component may be selected within a wide range, and preferably, the precursor of the hydrogenation active metal component is at least one selected from the group consisting of salts, oxides, and hydroxides of the hydrogenation active metal component.

In a preferred embodiment, the precursor of Group VIB metal component is a precursor comprising Mo and/or W; further preferably, the precursor of Group VIB metal component is at least one selected from the group consisting of molybdenum oxide, molybdate, paramolybdate, phosphomolybdate, tungsten oxide, and tungstate, and more preferably at least one selected from the group consisting of molybdenum oxide, ammonium molybdate, ammonium paramolybdate, phosphomolybdic acid, ammonium metatungstate, phosphotungstic acid, and ammonium paratungstate.

In a preferred embodiment, the precursor of Group VIII metal component is a precursor comprising Co and/or Ni; preferably, the precursor of Group VIII metal component is at least one selected from the group consisting of cobalt nitrate, cobalt acetate, basic cobalt carbonate, cobalt chloride, and nitrate, chloride, formate, acetate, phosphate, citrate, oxalate, carbonate, basic carbonate, hydroxide, phosphide, sulfide, aluminate, and oxide of nickel. More preferably, the precursor of Group VIII metal component is at least one selected from the group consisting of cobalt nitrate, cobalt acetate, basic cobalt carbonate, cobalt chloride and oxalate, carbonate, basic carbonate, hydroxide, phosphate and oxide of nickel, and still more preferably at least one selected from the group consisting of cobalt nitrate, basic cobalt carbonate, nickel nitrate, nickel acetate, basic nickel carbonate, nickel chloride and nickel carbonate.

In the second type of preferred embodiments of the method according to the present application, there is no particular limitation to the method of mixing the pseudo-boehmite with the precursor of the hydrogenation active metal component, and any method conventionally used in the art may be used, of which the examples include kneading, dry blending, and impregnation.

In a preferred embodiment, the mixing of the pseudo-boehmite with the precursor of the hydrogenation active metal component comprises uniformly mixing at least one precursor of Group VIB metal component and at least one precursor of Group VIII metal component with the pseudo-boehmite, and then kneading.

In another preferred embodiment, the mixing of the pseudo-boehmite with the precursor of the hydrogenation active metal component comprises kneading a solution comprising at least one Group VIB metal compound and at least one Group VIII metal compound, wherein the Group VIB metal compound and the Group VIII metal compound is each independently at least one selected from the group consisting of their soluble compounds (including the corresponding metal compounds soluble in water in the presence of a co-solvent), specific examples of which are described above, and detailed description thereof is omitted herein for brevity.

In the second type of preferred embodiments of the method according to the present application, there is no particular limitation to the drying conditions, and preferably, the drying conditions may include: a drying temperature of 50-350° C. and a drying time of 1-12 hr, preferably a drying temperature of 80-250° C., and a drying time of 2-8 hr; the manner of the drying is not particularly limited either, and may be at least one selected from oven drying, air-blast drying, spray drying and flash drying. The drying atmosphere is not particularly limited either, and may be at least one selected from air, oxygen and nitrogen, and is preferably air.

According to the present application, organic additive(s) may also be introduced during the preparation of the catalyst, such as during the preparation of the soluble compounds of the Group VIB and Group VIII metal compounds. The manner of introducing the organic additive is not particularly limited in the present application, and the organic additive may be introduced in any manner, for example, may be introduced together with the Group VIII metal, together with the Group VIB metal element, after introducing the Group VIII and/or Group VIB metal element, or before introducing the Group VIII and/or Group VIB element. There is no particular limitation to the kind of the organic additive in the present application, and the organic additive may be at least one selected from the group consisting of oxygen-containing and/or nitrogen-containing organic materials, the oxygen-containing organic materials may be selected from organic alcohols and/or organic acids, and the nitrogen-containing organic materials may be at least one selected from the group consisting of organic amines and organic amine salts. Particularly, the oxygen-containing organic matter may be at least one selected from the group consisting of ethylene glycol, glycerol, polyethylene glycol (with a molecular weight of 200-1500), diethylene glycol, butanediol, acetic acid, maleic acid, oxalic acid, nitrilotriacetic acid, cyclohex-1,2-ylenediaminetetra (acetic acid), citric acid, tartaric acid and malic acid, and preferably at least one selected from the group consisting of ethylene glycol, glycerol, polyethylene glycol and citric acid; the nitrogen-containing organic material may be at least one selected from the group consisting of ethylenediamine, diethylenetriamine, cyclohexylenediaminetetra(acetic acid), glycine, nitrilotriacetic acid, EDTA and amine salts thereof, preferably EDTA and/or nitrilotriacetic acid.

In the method for preparing the hydrogenation catalyst of the present application, when the hydrogenation active metal component is loaded on the phosphorus-containing pseudo-boehmite or the phosphorus-containing pseudo-boehmite shaped product by impregnation, the impregnation method and time are not particularly limited in the present application. The impregnation method can be excessive liquid impregnation, pore volume impregnation, multiple impregnation and the like, depending on the amount of the impregnating solution used, and can be soaking impregnation, spray impregnation and the like, depending on the implementation mode of impregnation; the impregnation time is preferably 0.5 to 3 hours. By adjusting and controlling the concentration, amount or carrier amount of the impregnating solution, hydrogenation catalysts with specific content of hydrogenation active metal component can be obtained, which is well known to those skilled in the art.

In the method for preparing the hydrogenation catalyst of the present application, there is no particular limitation to the method for shaping the phosphorus-containing pseudo-boehmite or the mixture of the phosphorus-containing pseudo-boehmite and the hydrogenation active metal component, and the shaping may be carried out according to a method conventionally used in the art, such as a rolling ball method, a pellet method and a screw extrusion method. In the shaping process, for example in the screw extrusion process, to ensure the smooth progress of the shaping, water, extrusion aid and/or peptizing agent, and optionally pore-expanding agent, can be added, and then extrusion shaping is carried out. The kind and amount of the extrusion aid, the peptizing agent and the pore-expanding agent can be those well known to those skilled in the art. For example, typical extrusion aid may be at least one selected from the group consisting of sesbania powder, methylcellulose, starch, polyvinyl alcohol and polyethylene ethanol, the peptizing agent may be an inorganic acid and/or an organic acid, and the pore-expanding agent may be at least one selected from the group consisting of starch, synthetic cellulose, polymeric alcohol and surfactant. Among others, the synthetic cellulose is preferably at least one selected from the group consisting of hydroxymethyl cellulose, methyl cellulose, ethyl cellulose and hydroxy fiber fatty alcohol polyvinyl ether, and the polymeric alcohol is preferably at least one selected from the group consisting of polyethylene glycol, polypropylene glycol and polyvinyl alcohol. The surfactant is preferably at least one selected from the group consisting of fatty alcohol polyvinyl ether, fatty alcohol amide and derivatives thereof, allyl alcohol copolymer and maleic acid copolymer with a molecular weight of 200-10000. The product obtained after the shaping may have a shape of clover, butterfly, cylinder, hollow cylinder, quatrefoil, quintefoil, sphere, or the like.

In a particularly preferred embodiment, the method for preparing the hydrogenation catalyst of the present application comprises the steps of:

i) adding an inorganic aluminum-containing compound solution comprising a phosphorus-containing compound and a grain growth regulator and an alkali solution or an acid solution into a reaction container in a concurrent flow or intermittent mode for precipitation reaction to obtain a phosphorus-containing hydrated alumina slurry; or, adding a phosphorus-containing compound and a grain growth regulator into deionized water to perform hydrolysis reaction with aluminum alkoxide to obtain a phosphorus-containing hydrated alumina slurry, and adjusting the dosage of the acid solution or the alkali solution to perform the precipitation reaction or hydrolysis reaction at a pH of 4-7, preferably 4-6.5; adding an alkaline solution into the resulting phosphorus-containing hydrated alumina slurry to adjust the pH to 7-10.5, aging at 50-95° C. for 0.5-8 hours, and then filtering, washing and drying, to obtain the phosphorus-containing pseudo-boehmite;

ii) impregnating the phosphorus-containing pseudo-boehmite obtained in the step i) with an impregnating solution comprising at least one Group VIB metal compound and at least one Group VIII metal compound, shaping by screw extrusion, and then drying for 1-12 hours at 50-350° C.; and iii) calcining the solid product obtained in the step ii) at a temperature of 560-800° C. for 1-10 hours to obtain the hydrogenation catalyst.

In another particularly preferred embodiment, the method for preparing the hydrogenation catalyst of the present application comprises the steps of:

i) adding an inorganic aluminum-containing compound solution comprising a phosphorus-containing compound and a grain growth regulator and an alkali solution or an acid solution into a reaction container in a concurrent flow or intermittent mode for precipitation reaction to obtain a phosphorus-containing hydrated alumina slurry; or, adding a phosphorus-containing compound and a grain growth regulator into deionized water to perform hydrolysis reaction with aluminum alkoxide to obtain a phosphorus-containing hydrated alumina slurry, and adjusting the dosage of the acid solution or the alkali solution to perform the precipitation reaction or the hydrolysis reaction at a pH of 4-7, preferably 4-6.5; adding an alkaline solution into the resulting phosphorus-containing hydrated alumina slurry to adjust the pH to 7-10.5, aging at 50-95° C. for 0.5-8 hours, and then filtering, washing and drying, to obtain the phosphorus-containing pseudo-boehmite;

ii) kneading at least one precursor of Group VIB metal component and at least one precursor of Group VIII metal component with the phosphorus-containing pseudo-boehmite obtained in the step i), shaping by screw extrusion, and then drying at 50-350° C. for 1-12 hours; and iii) calcining the solid product obtained in the step ii) at a temperature of 560-800° C. for 1-10 hours to obtain the hydrogenation catalyst.

In a fifth aspect, there is provided the use of the hydrogenation catalyst according to the present application or the hydrogenation catalyst obtained by the method of the present application in the hydrogenation of hydrocarbon oils.

According to the present application, the hydrogenation catalyst may be presulfurized prior to use according to those methods conventionally used in the art to convert the active metal component supported thereon to a metal sulfide component; the presulfurization method may include: subjecting the hydrogenation catalyst to presulfurization with sulfur, hydrogen sulfide or sulfur-containing starting materials at a temperature of 140-400° C. in the presence of hydrogen. The presulfurization can be carried out either ex-situ or in-situ.

The conditions of the hydrogenation reaction are not particularly limited in the present application, and can be those commonly used in the art. Preferably, the reaction conditions may include: a reaction temperature of 200-420° C., more preferably 220-400° C., a pressure of 2-18 MPa, more preferably 2-16 MPa, a liquid hourly space velocity of 0.1-10 h$^{-1}$, more preferably 0.15-6 h$^{-1}$, and a hydrogen-to-oil volume ratio of 50-5000, more preferably 50-4000.

The reaction device for the hydrogenation reaction is not particularly limited, and can be any reactor suitable for carrying out the reaction of the feedstock oil by contacting it with the hydrogenation catalyst under the hydrotreatment conditions, such as a fixed bed reactor, a slurry bed reactor, a moving bed reactor or an ebullating bed reactor.

The hydrocarbon oil is not particularly limited in the present application, and the hydrogenation catalyst of the present application can be directly used for processing various hydrocarbon oil feedstocks to perform hydro-upgrading or hydrocracking on the hydrocarbon oil feedstocks. The hydrocarbon oil feedstock can be various heavy mineral oils or synthetic oils or mixed distillates thereof, and may be, for example, at least one selected from the group consisting of crude oil, distillate oil, solvent refined oil, wax paste, subwax oil, Fischer-Tropsch synthetic oil, coal liquefied oil, light deasphalted oil and heavy deasphalted oil; the catalyst is particularly suitable for the hydrotreatment of at least one feedstock selected from the group consisting of gasoline, diesel oil, wax oil, lubricating oil, kerosene, naphtha, atmospheric residue, vacuum residue, petroleum wax and Fischer-Tropsch synthetic oil.

EXAMPLES

The present application will be further illustrated with reference to the following examples, but the present application is not limited thereto.

In the context of the present application, including the following examples and comparative examples:

The crystal structure (i.e., XRD pattern) of the phosphor-containing pseudo-boehmite was determined using a SIMENS D5005 X-ray diffractometer with CuKα radiation at 44 kV, mA, and a scan rate of 2°/min. According to the Scherrer equation: D=Kλ/(B cos θ) (D is the grain size, K is the Scherrer constant (using 0.89), X is the diffraction wavelength of the target material which is 0.15406 nm, B is the half-peak width of the corrected diffraction peak, is the position of the diffraction peak), the grain size D(020) of the crystal face corresponding to the (020) peak and the grain size D(031) of the crystal face corresponding to the (031) peak were calculated respectively using the parameters of the peak at 2θ of 10-15° and the parameters of the peak at 2θ of 34-43°, and h=D(031)/D(020) was calculated.

The IR spectrum of the phosphorus-containing alumina was measured using a Nicolet 870 Fourier Infrared Spectrometer from Nicolet corporation, USA. The measuring method was as follows: the sample was pressed into a self-supporting sheet, which is then placed in an infrared cell, the sample was treated for 3 hours at 450° C. under a vacuum condition, and then the IR spectrum of the sample was measured. The value of $(I_{3670}+I_{3580})/(I_{3770}+I_{3720})$ was calculated from the values of the height of the peak at 3670 cm$^{-1}$, the height of the peak at 3580 cm$^{-1}$, the height of the peak at 3770 cm$^{-1}$, and the height of the peak at 3720 cm$^{-1}$ in the spectrum.

The H$_2$-TPR (Hydrogen Temperature Programmed Reduction) test of the hydrogenation catalyst was carried out using an AutoChem II 2920 Versatile Adsorption Instrument from Micromeritics Instrument Corp., USA. The test method was as follows: 0.20 g of a 40-60 mesh catalyst was loaded in a U-shaped quartz tube, the temperature was raised to 50° C. at a rate of 2° C./min in 50 mL/min of argon, the sample was pretreated for 10 min, and then switched to Ar carrier gas with a H$_2$ volume fraction of 10% and a gas flow rate of 50 mL/min. After the baseline became stable, the temperature was raised to 1000° C. at a rate of 10° C./min, the carrier gas was passed through the reactor and then into a cold trap, water generated in the reduction process was condensed, and, meanwhile, signals were detected using a thermal conductivity cell detector, to obtain the TPR pattern of the sample.

The composition of the hydrogenation catalyst was measured using X-ray fluorescence spectrometry (XRF) according to the RIPP133-90 method, "Petrochemical Analysis Methods (RIPP Test Methods)", edited by Cuiding YANG et al., Science Press, September 1990, First Edition, pages 376-379, ISBN: 7-03-001894-X, the contents of which are incorporated herein by reference in their entirety.

In the following examples, unless otherwise stated, the starting materials were all commercially available products, and sesbania powder was available from Jiangsu Fengxian Runshun Trading Co. Ltd.

Example I-1

This example was provided to illustrate the hydrogenation catalyst and the method for its preparation of the present application.

5000 mL of an aluminum sulfate solution having a concentration of 60 g/l of alumina and comprising 6.0 g of ribitol and 8.0 mL of 85 wt % concentrated phosphoric acid was added together with an aqueous ammonia solution with a concentration of 6 wt % into a 2-liter reaction tank in a concurrent flow mode for precipitation reaction, at a reaction temperature of 50° C. for 30 minutes, wherein the flow rate of the aqueous ammonia solution was controlled to obtain a pH of the reaction system of 5.0. After the precipitation reaction was completed, an appropriate amount of ammonia water was added into the slurry to obtain a pH of the slurry of 8.7, the slurry was aged at 70° C. for 120 min and filtered, the filter cake was slurried and washed with deionized water for 2 times, and then dried at 120° C. for 24 hr, to obtain a hydrated alumina PA-I-1, which had a pseudo-boehmite structure as determined by XRD.

The h-value of PA-I-1 calculated based on the XRD characterization is shown in Table I-1. The relative crystallinity and the $P_2O_5$ content of PA-I-1 are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

1000 g of PA-I-1 and 30 g of sesbania powder (available from Jiangsu Fengxian Runshun Trading Co. Ltd.) were uniformly mixed, 920 ml of an aqueous solution containing 28 g of nitric acid was added and mixed, and then wet butterfly-shaped extrudates having an outer diameter of 1.7 mm were extruded on a single-screw extruder, and the wet butterfly-shaped extrudates were dried at 120° C. for 4 hours to obtain a shaped product Z-I-1.

130 g of the shaped product Z-I-1 was taken, 110 ml of a mixed aqueous solution (comprising 434 g/l of $MoO_3$, 78 g/l of NiO and 160 g/l of citric acid) composed of ammonium molybdate, nickel nitrate and citric acid was used for impregnating the shaped product Z-I-1 for 2 hours, the resulting product was dried for 4 hours at a temperature of 110° C. and calcined for 3 hours at a temperature of 650° C., to obtain a hydrogenation catalyst C-I-1. The measured value S obtained from the $H_2$-TPR pattern, the distribution factor σ of the hydrogenation active metal component and the content of metal oxides of the hydrogenation catalyst are shown in Table I-2.

Comparative Example I-1

A shaped product DZ-I-1 and a hydrogenation catalyst DC-I-1 were prepared and tested as described in Example I-1, except that: the calcining was carried out for 3 hours at 420° C.

Comparative Example I-2

A shaped product DZ-I-2 and a hydrogenation catalyst DC-I-2 were prepared and tested as described in Example I-1, except that: the calcining was carried out at 820° C. for 3 hours.

Example I-2

A shaped product Z-I-2 and a hydrogenation catalyst C-I-2 were prepared as described in Example I-1, except that: in the aluminum sulfate solution used, only 8.0 mL of phosphoric acid having a concentration of 85% by weight was added, while no ribitol was comprised, to obtain hydrated alumina PA-I-2. PA-I-2 has a pseudo-boehmite structure as determined by XRD characterization as described in Example I-1, and the h-value of PA-I-2 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

Example I-3

A shaped product Z-I-3 and a hydrogenation catalyst C-I-3 were prepared as described in Example I-1, except that: the flow of the aqueous ammonia solution was directly controlled to obtain a pH value of the reaction system of 8.7, and after the precipitation reaction was completed, no ammonia water was added into the slurry to adjust the pH value, to obtain a hydrated alumina PA-I-3. PA-I-3 has a pseudo-boehmite structure as determined by XRD characterization as described in Example I-1, and the h-value of PA-I-3 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

Comparative Example I-3

A shaping DZ-I-3 and a hydrogenation catalyst DC-I-3 were prepared as described in Example I-1, except that: in the aluminum sulfate solution used, only 6.0 g of ribitol was added while no concentrated phosphoric acid was comprised, to obtain a hydrated alumina CPA-I-3, and the calcining was carried out at 420° C. for 3 hours. CPA-I-3 has a pseudo-boehmite structure as determined by XRD characterization as described in Example I-1, and the h-value of CPA-I-3 calculated based on the XRD characterization is shown in Table I-1, and the relative crystallinity and $P_2O_5$ content thereof are also shown in Table I-1. The hydroxyl group on the surface of the alumina was measured by IR spectroscopy after calcining at 600° C. for 4 hours, and the $(I_{3670}+I_{3580})/(I_{3770}+I_{3720})$ value is shown in Table I-1.

Example I-4

This example was provided to illustrate the hydrogenation catalyst and the method for its preparation of the present application.

4000 mL of an aluminum trichloride solution having a concentration of 45 g/l of alumina and comprising 22.1 mL of 85 wt % concentrated phosphoric acid and 4.52 g/l of sorbitol was added together with 1000 mL of a sodium metaaluminate solution having a concentration of 210 g/l of alumina and a caustic module of 1.58 into a 2-liter reaction tank in a concurrent flow mode to conduct a precipitation reaction at a reaction temperature of 80° C., the flow rate of the reactants was adjusted so that the pH value of the precipitation reaction was 4.0, and the reaction residence time was 15 minutes. Dilute ammonia water with a concentration of 5 wt % was added into the resulting slurry to adjust the pH value of the slurry to 9.0, the resultant was heated to 85° C., aged for 3 hours, and filtered using a vacuum filter. After the filtering, the filter cake was rinsed for about 30 minutes by adding thereto 20 liters of deionized water (85° C.). The qualified filter cake obtained after washing was added into 3.0 liters of deionized water, stirred to obtain a slurry, the slurry was pumped into a spray dryer for drying, the temperature at the outlet of the spray dryer was controlled to be within a range of 100-110° C., and the material was dried for about 2 minutes to obtain a hydrated alumina PA-I-4. PA-I-4 has a pseudo-boehmite structure as determined by XRD characterization as described in Example I-1, and the h-value of PA-I-4 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

A shaped product Z-I-4 was prepared as described in Example I-1, except that PA-I-4 was used instead of PA-I-1.

130 g of the shaped product Z-I-4 was taken, 110 ml of a mixed aqueous solution (comprising 201 g/l of $MoO_3$, 40 g/l of CoO and 50 g/l of ammonia water) composed of ammonium molybdate, cobalt nitrate and ammonia water was used for impregnating the shaped product Z-I-4 for 1 hour, then the resultant was dried for 3 hours at 120° C., and calcined for 5 hours at 650° C., to obtain a hydrogenation catalyst C-I-4. The measured value S obtained from the $H_2$-TPR pattern, the distribution factor σ of the hydrogenation active metal component and the content of metal oxides of the hydrogenation catalyst are shown in Table I-2.

Example I-5

This example was provided to illustrate the hydrogenation catalyst and the method for its preparation of the present application.

3000 mL of an aluminum sulfate solution having a concentration of 60 g/l of alumina and 4.5 g/l of gluconic acid and comprising 3.5 mL of 85 wt % concentrated phosphoric acid was added together with 1000 mL of a sodium metaaluminate solution having a concentration of 200 g/l of alumina and a caustic module of 1.58 into a 2-liter reaction tank in a concurrent flow mode to conduct a precipitation reaction at a reaction temperature of 55° C., the flow rate of the reactants was adjusted so that the pH value of the precipitation reaction was 6.5, and the reaction residence time was 15 minutes. Then, a sodium carbonate solution with a concentration of 100 g/l was added into the resulting slurry, to adjust the pH of the slurry to 9.5, the resultant was heated to 75° C., aged for 5 hr, and filtered using a vacuum filter. After the filtering, the filter cake was rinsed for about 30 minutes by adding thereinto 20 liters of deionized water (85° C.). The filter cake was dried for 24 hours at 120° C. to obtain a hydrated alumina PA-I-5. PA-I-5 has a pseudo-boehmite structure as determined by XRD characterization as described in Example I-1, and the h-value of PA-I-5 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

1 kg of carrier PA-I-5, 30 g of sesbania powder (available from Jiangsu Fengxian Runshun Trading Co. Ltd.) and 30 g of hydroxypropyl methyl cellulose were weighed and mixed uniformly, 1.2 liters of an aqueous nitric acid solution with a volume concentration of 1% was added and mixed uniformly, then the mixture was further kneaded on a double-screw strip extruder to form a plastic body, and then extruded to obtain butterfly-shaped wet extrudates with a diameter of 1.1 mm, and the butterfly-shaped wet extrudates were dried at 110° C. for 2 hours to obtain a shaped product Z-I-5.

130 g of the shaped product Z-I-5 was taken, impregnated for 2 hours with 220 ml of a mixed aqueous solution (comprising 230 g/l of $MoO_3$, 54 g/l of NiO and 50 g/l of phosphoric acid) composed of molybdenum oxide, basic nickel carbonate and phosphoric acid, dried for 3 hours at 120° C., and calcined for 3 hours at 700° C. to obtain a hydrogenation catalyst C-I-5. The measured value S obtained from the $H_2$-TPR pattern, the distribution factor σ of the hydrogenation active metal component and the content of metal oxides of the hydrogenation catalyst are shown in Table I-2.

Example I-6

A shaped product Z-I-6 and a hydrogenation catalyst C-I-6 were prepared as described in Example I-5, except that: in the precipitation reaction, the flow rate of the reactants was adjusted so that the pH value of the precipitation reaction was 7, to obtain a hydrated alumina PA-I-6. PA-I-6 has a pseudo-boehmite structure as determined by XRD characterization as described in Example I-1, and the h-value of PA-I-6 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

1000 g of PA-I-6 was taken to prepare a shaped product Z-I-6 as described in Example I-1. The procedure for preparing a hydrogenation catalyst C-I-6 from the shaped product Z-I-6 was as follows: 130 g of the shaped product Z-I-6 was taken, impregnated for 3 hours with 220 ml of a mixed aqueous solution (comprising 230 g/l of $MoO_3$, 54 g/l of NiO and 50 g/l of phosphoric acid) composed of molybdenum oxide, basic nickel carbonate and phosphoric acid, dried for 3 hours at 120° C., and calcined for 3 hours at 700° C. to obtain the hydrogenation catalyst C-I-6. The measured value S obtained from the $H_2$-TPR pattern, the distribution factor σ of the hydrogenation active metal component and the content of metal oxides of the hydrogenation catalyst are shown in Table I-2.

Example I-7

This example was provided to illustrate the hydrogenation catalyst and the method for its preparation of the present application.

To a 2-liter three-neck flask equipped with a stirrer and a refluxing condenser, 1000 g of an isopropanol-water azeotrope (with a water content of 15 wt %), 4.6 mL of 85% concentrated phosphoric acid and 15 g of ribonic acid was added, and ammonia water was added to adjust the pH value to be 5.1, and the resultant was heated to 60° C. 500 g of molten aluminum isopropoxide was slowly added dropwise into the flask through a separating funnel, reacted for 2 hours, adjusted to a pH of 8.5 by adding ammonia water, reacted under refluxing for 20 hours, and then half of the isopropanol was evaporated off. The resultant was aged at 80° C. for 6 hours, the rest of the isopropanol was evaporated off during the aging, the aged hydrated alumina was filtered, and dried at 120° C. for 24 hours to obtain a hydrated alumina PA-I-7. PA-I-7 has a pseudo-boehmite structure as determined by XRD characterization as described in Example I-1, and the h-value of PA-I-7 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

1000 g of PA-I-7 was taken to prepare a shaped product Z-I-7, as described in Example I-1.

130 g of the shaped product Z-I-7 was taken, impregnated for 3 h with 110 ml of a mixed aqueous solution (comprising 183 g/l of $MoO_3$, 44 g/l of NiO and 60 g/l of phosphoric acid) composed of molybdenum oxide, basic nickel carbonate and phosphoric acid, dried for 3 h at 120° C., and calcined for 3 h at 730° C., to obtain a hydrogenation catalyst C-I-7. The measured value S obtained from the $H_2$-TPR pattern, the distribution factor σ of the hydrogenation active metal component and the content of metal oxides of the hydrogenation catalyst are shown in Table I-2.

Comparative Example I-4

A shaped product DZ-I-4 and a hydrogenation catalyst DC-I-4 were prepared and tested as described in Example I-7, except that: the calcining was carried out at 820° C. for 3 hours.

Example I-8

A shaped product Z-I-8 and a hydrogenation catalyst C-I-8 were prepared as described in Example I-7, except that: a hydrated alumina PA-I-8 was obtained without adding the ribonic acid into the three-neck flask. PA-I-8 has a pseudo-boehmite structure as determined by XRD characterization as described in Example I-1, and the h-value of PA-I-8 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

Example I-9

A shaped product Z-I-9 and a hydrogenation catalyst C-I-9 were prepared as described in Example I-7, except that: after the same amount of ribonic acid was added, ammonia water was added to adjust the pH to 8.5, the resultant was heated to 60° C., and then 500 g of molten aluminum isopropoxide was slowly added dropwise to the flask through a separating funnel, to obtain a hydrated alumina PA-I-9. PA-I-9 has a pseudo-boehmite structure as determined by XRD characterization as described in Example I-1, and the h-value of PA-I-9 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

Comparative Example I-5

A shaped product DZ-I-5 and a hydrogenation catalyst DC-I-5 were prepared as described in Example I-7, except that: no concentrated phosphoric acid was added to the three-necked flask, to obtain a hydrated alumina CPA-I-5, and the calcining was carried out at 430° C. for 3 hours.

CPA-I-5 has a pseudo-boehmite structure as determined by XRD characterization as described in Example I-1, and the h-value of CPA-I-5 calculated based on the XRD characterization is shown in Table I-1, and the relative crystallinity thereof is also shown in Table I-1. The hydroxyl group on the surface of the alumina was measured by IR spectroscopy after calcining at 600° C. for 4 hours, and the $(I_{3670}+I_{3580})/(I_{3770}+I_{3720})$ value is shown in Table I-1.

Example I-10

This example was provided to illustrate the hydrogenation catalyst and the method for its preparation of the present application.

To a 2-liter three-neck flask equipped with a stirrer and a refluxing condenser, 1000 g of an isopropanol-water azeotrope (with a water content of 15 wt %), 7.0 mL of 85% concentrated phosphoric acid and 12 g of ribonic acid were added, and then ammonia water was added to adjust the pH value to 6.2, the resultant was heated to 60° C. 500 g of molten aluminum isopropoxide was slowly added dropwise into the flask through a separating funnel, reacted for hours, adjusted to a pH of 8.5 by adding ammonia water, reacted under refluxing for 20 hours, and then half of the isopropanol was evaporated off. The resultant was aged at 80° C. for 6 hours, the rest of isopropanol was evaporated off during the aging, the aged hydrated alumina was filtered, and dried at 120° C. for 24 hours to obtain a hydrated alumina PA-I-10. PA-I-10 has a pseudo-boehmite structure as determined by XRD characterization as described in Example I-1, and the h-value of PA-I-10 calculated based on the XRD characterization is shown in Table I-1, and the relative crystallinity and $P_2O_5$ content thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

1000 g of PA-I-10 was taken to prepare a shaped product Z-I-10 as described in Example I-1.

130 g of the shaped product Z-I-10 was taken, impregnated for 4 hours with 110 ml of a mixed aqueous solution (containing 249 g/l of $MoO_3$, 59 g/l of NiO and 70 g/l of phosphoric acid) composed of molybdenum oxide, basic nickel carbonate and phosphoric acid, dried for 3 hours at 120° C., and calcined for 3 hours at 730° C. to obtain a hydrogenation catalyst C-I-10. The measured value S obtained from the $H_2$-TPR pattern, the distribution factor σ of the hydrogenation active metal component and the content of metal oxides of the hydrogenation catalyst are shown in Table I-2.

Example I-11

A shaped product Z-I-11 and a hydrogenation catalyst C-I-11 were prepared and tested as described in Example I-10, except that: the calcining was carried out at 630° C. for 3 hours.

Example I-12

A shaped product Z-I-12 and a hydrogenation catalyst C-I-12 were prepared as described in Example I-10, except that: the calcining was carried out at 780° C. for 3 hours.

Example I-13

A shaped product Z-I-13 and a hydrogenation catalyst C-I-13 were prepared as described in Example I-10, except that: the phosphorus-containing pseudo-boehmite was prepared according to a typical method described in Research on Carrier for Heavy Oil Hydrogenation Catalyst, in which 8.8 mL of 85% concentrated phosphoric acid and 3000 mL of an aluminum sulfate solution with a concentration of 57 g/l were subjected to precipitation reaction with 2500 mL of a sodium metaaluminate solution with a concentration of 64 g/l, at a neutralization pH of 8.0 for a reaction time of 70 min. After that, the resultant was aged at a temperature of 90° C. and a pH of 8.5, and then filtered. The filter cake was slurried and washed for 2 times using deionized water, and then dried for 24 hours at 120° C. to obtain a phosphorus-containing pseudo-boehmite PA-I-13. PA-I-13 has a pseudo-boehmite structure as determined by XRD characterization as described in Example I-1, and the h-value of PA-I-13 calculated based on the XRD characterization is shown in Table I-1, and the relative crystallinity and the content of $P_2O_5$ thereof are also shown in Table I-1. The hydroxyl group on the surface of the phosphorus-containing alumina was measured by IR spectroscopy after calcining at 600° C. for 4 hours, and the $(I_{3670}+I_{3580})/(I_{3770}+I_{3720})$ value is shown in Table I-1.

Comparative Example I-6

The hydroxyl group on the surface of a dry alumina powder CPA-I-6 (available from Changling Branch of Sinopec Catalyst Co., Ltd., mainly composed of alumina) was measured by IR spectroscopy after calcining at 600° C. for 4 hours, and the $(I_{3670}+I_{3580})/(I_{3770}+I_{3720})$ value is shown in Table I-1.

300 g of the dry alumina powder CPA-I-6 and 10 g of sesbania powder (available from Henan Lankou Sesbania Rubber Plant) were taken and uniformly mixed to obtain a mixture, the mixture was mixed with 360 ml of an aqueous solution containing 7 g of nitric acid at room temperature, further kneaded into a plastic body on a double-screw strip extruder and then extruded into butterfly-shaped wet extrudates with a diameter of 1.4 mm, and the wet butterfly-shaped extrudates were dried at a temperature of 120° C. for 4 hours and then calcined at a temperature of 600° C. for 4 hours to obtain the carrier DZ-I-6. 100 g of the carrier DZ-I-6 was impregnated with 110 ml of a mixed aqueous solution composed of molybdenum oxide, basic nickel carbonate and phosphoric acid (comprising 249 g/l of $MoO_3$, 59 g/l of NiO and 78 g/l of phosphoric acid), dried at 120° C. for 4 hours and calcined at 400° C. for 3 hours, to obtain a hydrogenation catalyst DC-I-6.

TABLE I-1

Properties of pseudo-boehmite involved in the examples and comparative examples

| Example No. | Sample name | D(020), nm | D(031), nm | Relative crystallinity, % | h value | $P_2O_5$ content, wt % | m |
|---|---|---|---|---|---|---|---|
| Example I-1 | PA-I-1 | 2.4 | 5.7 | 65 | 2.37 | 3 | 2.07 |
| Comparative Example I-1 | CPA-I-1 | 2.4 | 5.7 | 65 | 2.37 | 3 | 2.07 |
| Comparative Example I-2 | CPA-I-2 | 2.4 | 5.7 | 65 | 2.37 | 3 | 2.07 |
| Example I-2 | PA-I-2 | 3.3 | 5.1 | 69 | 1.55 | 3 | 1.66 |
| Example I-3 | PA-I-3 | 3.4 | 4.2 | 71 | 1.24 | 3 | 1.37 |
| Comparative Example I-3 | CPA-I-3 | 3.5 | 5.5 | 75 | 1.57 | 0 | 1.10 |
| Example I-4 | PA-I-4 | 2.2 | 5.6 | 67 | 2.55 | 6 | 2.43 |
| Example I-5 | PA-I-5 | 2.3 | 6.6 | 66 | 2.87 | 1 | 2.64 |
| Example I-6 | PA-I-6 | 2.2 | 5.0 | 65 | 2.27 | 1 | 2.12 |
| Example I-7 | PA-I-7 | 2.2 | 4.3 | 69 | 1.95 | 2 | 2.22 |
| Comparative Example I-4 | CPA-I-4 | 2.2 | 4.3 | 69 | 1.95 | 2 | 2.22 |
| Example I-8 | PA-I-8 | 2.6 | 4.1 | 70 | 1.58 | 2 | 1.56 |
| Example I-9 | PA-I-9 | 3.5 | 3.6 | 73 | 1.03 | 2 | 1.18 |
| Comparative Example I-5 | CPA-I-5 | 3.2 | 3.8 | 75 | 1.19 | 0 | 1.65 |
| Example I-10 | PA-I-10 | 3.4 | 6.4 | 77 | 1.88 | 3 | 2.13 |
| Example I-11 | PA-I-11 | 3.4 | 6.4 | 77 | 1.88 | 3 | 2.13 |
| Example I-12 | PA-I-12 | 3.4 | 6.4 | 77 | 1.88 | 3 | 2.13 |
| Example I-13 | PA-I-13 | 3.3 | 4.5 | 71 | 1.36 | 3 | 1.78 |
| Comparative Example I-6 | CPA-I-6 | 2.5 | 3.0 | 80 | 1.19 | 0 | 1.25 |

Note:

m represents a value of $(I_{3670} + I_{3580})/(I_{3770} + I_{3720})$

TABLE I-2

Properties of the hydrogenation catalysts obtained in the examples and comparative examples

| Example No. | Catalyst name | Distribution factor of Group VIB metal components $\sigma_{VIB}(R)$ | Distribution factor of Group VIII metal components $\sigma_{VIII}(R)$ | $S(P_{low\text{-}temp\ peak}/P_{hi\text{-}temp\ peak})$ | Content of metal oxides, wt % | | | |
|---|---|---|---|---|---|---|---|---|
| | | | | | $WO_3$ | $MoO_3$ | NiO | CoO |
| Example I-1 | C-I-1 | 1 | 1.01 | 1.18 | / | 28 | 5 | / |
| Comparative Example I-1 | DC-I-1 | 1.02 | 0.98 | 2.51 | / | 28 | 5 | / |
| Comparative Example I-2 | DC-I-2 | 1.03 | 1 | 0.36 | / | 28 | 5 | / |
| Example I-2 | C-I-2 | 1.5 | 1.16 | 1.13 | / | 28 | 5 | / |
| Example I-3 | C-I-3 | 1.4 | 1.19 | 1.10 | / | 28 | 5 | / |
| Comparative Example I-3 | DC-I-3 | 3.9 | 1.23 | 2.67 | / | 28 | 5 | / |
| Example I-4 | C-I-4 | 1.05 | 0.99 | 1.16 | / | 12.5 | / | 2.5 |
| Example I-5 | C-I-5 | 1 | 1 | 1.14 | / | 22 | 5.4 | / |
| Example I-6 | C-I-6 | 1.03 | 1.02 | 1.09 | / | 22 | 5.4 | / |
| Example I-7 | C-I-7 | 1.05 | 1.02 | 1.05 | / | 14.5 | 3.5 | / |
| Comparative Example I-4 | DC-I-4 | 1.04 | 0.98 | 2.42 | / | 14.5 | 3.5 | / |
| Example I-8 | C-I-8 | 1.6 | 1.15 | 1.35 | / | 14.5 | 3.5 | / |
| Example I-9 | C-I-9 | 1.4 | 1.16 | 1.25 | / | 14.5 | 3.5 | / |
| Comparative Example I-5 | DC-I-5 | 3.6 | 1.25 | 2.41 | / | 14.5 | 3.5 | / |
| Example I-10 | C-I-10 | 0.99 | 0.98 | 1.02 | / | 18 | 4.3 | / |
| Example I-11 | C-I-11 | 1.03 | 0.99 | 1.12 | / | 18 | 4.3 | / |
| Example I-12 | C-I-12 | 1.03 | 0.99 | 1.01 | / | 18 | 4.3 | / |
| Example I-13 | C-I-13 | 2.6 | 1.17 | 1.21 | / | 18 | 4.3 | / |
| Comparative Example I-6 | DC-I-6 | 1.01 | 0.99 | 2.38 | / | 18 | 4.3 | / |

As can be seen from the results of Table I-1, the phosphorus-containing pseudo-boehmite prepared using the method of the present application has the characteristic of $1.7 \leq h \leq 3$, preferably $2.2 \leq h \leq 2.8$, while various pseudo-boehmites prepared using a method other than that of the present application all have an h value of less than 1.7. In the IR spectrum of the phosphorus-containing alumina obtained by calcining the phosphorus-containing pseudo-boehmite prepared by the method of the present application at 600° C., the hydroxyl group has a characteristic $(I_{3670}+I_{3580})/(I_{3770}+I_{3720})$ of 1.9-2.8, preferably 2-2.7, while in an IR spectrum of the alumina obtained by calcining the pseudo-boehmite not prepared by the method of the present application at 600° C., the hydroxyl group has a characteristic $(I_{3670}+I_{3580})/(I_{3770}+I_{3720})<1.8$.

As can be seen from the results of Table I-2, the hydrogenation catalyst according to the present application has a specific structure, as characterized by the $H_2$-TPR pattern with a measured value S in a range of 0.5-2.0, preferably 0.8-1.8, whereas the S value of the catalysts of the comparative examples typically falls out of this range.

Test Example I-1

This test example is provided to illustrate the hydrogenation activity and reaction stability of the hydrogenation catalyst of the present application.

100 mL of each hydrogenation catalyst obtained in Examples I-1 to I-13 and Comparative Examples I-1 to I-6 was crushed into particles having a diameter of 2-3 mm and then presulfurized under the conditions including: a sulfurized oil of 5 w % dimethyl disulfide/Jingmen kerosene distillate, a liquid hourly volume space velocity of the sulfurized oil of 1.2 h$^{-1}$, a hydrogen partial pressure of 14.0 MPa, a hydrogen-to-oil volume ratio of 400, and a sulfurization carried out for 3 hours at a constant temperature of 360° C.; and the evaluation was then carried out in a fixed bed reactor (with a catalyst loading amount of 100 ml). The feedstock was inferior atmospheric residue from the atmospheric and vacuum distillation unit of Shijiazhuang refinery (as a heavy oil feedstock, with a sulfur content of 2.39 wt %, a nitrogen content of 0.33 wt %, and a carbon residue of 11.5 wt %, a nickel content of 23 g/g, and a vanadium content of 41.6 μg/g), and the hydrogenation activity performance was tested under the conditions including a reaction temperature of 380° C., a hydrogen partial pressure of 14 MPa, a liquid hour volume space velocity of 0.6 h$^{-1}$, and a hydrogen-to-oil volume ratio of 600. Particularly, after 150 h and 1500 h of reaction, the products were tested for the (Ni+V) removal rate, desulfurization rate, carbon residue removal rate and denitrification rate, and the results are shown in Table I-3.

The methods for the calculation of the (Ni+V) removal rate, the desulfurization rate, the carbon residue removal rate and the denitrification rate are similar, and the calculation methods are exemplified hereinbelow by the method for calculating (Ni+V) removal rate:

(Ni+V)removal rate=((Ni+V)content in the feedstock−(Ni+V)content in the hydrogenated product)/(Ni+V)content in the feedstock.

The content of nickel and vanadium in the oil sample was measured by an inductively coupled plasma atomic emission spectrometer (ICP-AES), using PE-5300 Plasma Photometer of Perkin-Elmer, USA, according to the RIPP124-90 method, "Petrochemical Analysis Methods (RIPP Test Methods)", pages 349-351; the sulfur content in the oil sample was measured by X-ray fluorescence spectrometry according to GB/T17040-2008; the content of carbon residue in the oil sample was measured by micro method according to RIPP149-90, "Petrochemical Analysis Methods (RIPP Test Methods)", page 420; the nitrogen content in the oil sample was measured by boat-inlet chemiluminescence method for measuring the nitrogen content in petroleum and petroleum products according to NB/SH/T0704-2010.

TABLE I-3

Test results of Test Example I-1

| Examples No. | Catalyst name | (Ni + V) removal rate, % 150 h | (Ni + V) removal rate, % 1500 h | Desulfurization rate, % 150 h | Desulfurization rate, % 1500 h | Carbon residue removal rate, % 150 h | Carbon residue removal rate, % 1500 h | Denitrification rate, % 150 h | Denitrification rate, % 1500 h |
|---|---|---|---|---|---|---|---|---|---|
| Example I-1 | C-I-1 | 79 | 75 | 86 | 86 | 54 | 50 | 40 | 36 |
| Comparative Example I-1 | DC-I-1 | 77 | 50 | 84 | 39 | 52 | 23 | 36 | 21 |
| Comparative Example I-2 | DC-I-2 | 59 | 49 | 42 | 31 | 33 | 23 | 15 | 10 |
| Example I-2 | C-I-2 | 78 | 74 | 84 | 80 | 50 | 46 | 36 | 32 |
| Example I-3 | C-I-3 | 77 | 73 | 82 | 78 | 51 | 47 | 35 | 31 |
| Comparative Example I-3 | DC-I-3 | 64 | 54 | 38 | 28 | 31 | 21 | 19 | 11 |
| Example I-4 | C-I-4 | 80 | 76 | 85 | 81 | 53 | 49 | 39 | 35 |
| Example I-5 | C-I-5 | 80 | 78 | 86 | 86 | 55 | 51 | 39 | 35 |
| Example I-6 | C-I-6 | 79 | 75 | 86 | 85 | 54 | 51 | 40 | 36 |
| Example I-7 | C-I-7 | 81 | 77 | 85 | 81 | 55 | 51 | 38 | 42 |
| Comparative Example I-4 | DC-I-4 | 78 | 49 | 81 | 41 | 49 | 26 | 34 | 13 |
| Example I-8 | C-I-8 | 76 | 72 | 82 | 78 | 48 | 45 | 35 | 31 |
| Example I-9 | C-I-9 | 77 | 73 | 80 | 76 | 50 | 47 | 34 | 30 |
| Comparative Example I-5 | DC-I-5 | 60 | 50 | 36 | 30 | 29 | 19 | 14 | 13 |
| Example I-10 | C-I-10 | 81 | 77 | 86 | 82 | 55 | 51 | 42 | 38 |
| Example I-11 | C-I-11 | 79 | 75 | 84 | 84 | 53 | 48 | 40 | 36 |
| Example I-12 | C-I-12 | 78 | 74 | 84 | 82 | 52 | 49 | 39 | 35 |
| Example I-13 | C-I-13 | 78 | 74 | 82 | 79 | 51 | 47 | 37 | 35 |
| Comparative Example I-6 | DC-I-6 | 76 | 55 | 79 | 45 | 48 | 26 | 34 | 23 |

As can be seen from the results in Table I-3, the hydrogenation catalyst of the present application shows better heteroatom removal effect under the same conditions, which indicates a better hydrogenation activity; moreover, as can be seen from the data measured after 150 h and 1500 h of reaction in Table I-3, the hydrogenation catalyst of the present application shows better reaction stability under the same conditions.

Test Example I-2

The desulfurization and denitrification activities of the hydrogenation catalyst of the present application are exemplified by Example I-1, Example I-5, Comparative Examples I-1 to I-2 and Comparative Example I-6.

The catalysts were respectively crushed into particles of 2-4 mm, and presulfurized on a 30 ml hydrogenation device under conditions including: a sulfurized oil of 5 w % carbon disulfide/cyclohexane, a hydrogen partial pressure of 6 MPa, a liquid hourly volume space velocity of 0.8 h$^{-1}$, a hydrogen-to-oil volume ratio of 800, and a sulfurization carried out for 3 hours at a constant temperature of 360° C.; then the catalyst was evaluated using a feedstock oil of catalytic diesel from Sinopec Qilu Petrochemical with a sulfur content of 5800 µg/g and a nitrogen content of 798 µg/g. The evaluation conditions were as follows: a reaction temperature of 350° C., a hydrogen partial pressure of 6 MPa, a liquid hourly volume space velocity of 2 h$^{-1}$, and a hydrogen-to-oil volume ratio of 300. The test results of hydrodesulfurization and hydrodenitrogenation activities after 100 h and 1000 h of reaction are shown in Table I-4.

The hydrodesulfurization activity of the catalyst is calculated based on a 1.65-order reaction, and the hydrodenitrogenation activity is calculated based on a first-order reaction, and the equations are respectively as follows:

$$\text{Hydrodesulfurization activity} = \text{Volume space velocity} \times \left( \frac{1}{\text{Sulfur content}^{0.65} \text{ in the product}} - \frac{1}{\text{Sulfur content in}^{0.65} \text{ the feedstock}} \right)$$

$$\text{Hydrodenitrogenation activity} = Ln\left[ \frac{\text{Nitrogen content in the feedstock}}{\text{Nitrogen content in the product}} \right]$$

TABLE I-4

Test results of Test Example I-2

| Example No. | Catalyst name | Hydrodesulfurization activity, % 100 h | Hydrodesulfurization activity, % 1000 h | Hydrodenitrogenation activity, % 100 h | Hydrodenitrogenation activity, % 1000 h |
|---|---|---|---|---|---|
| Example I-1 | C-I-1 | 159 | 150 | 138 | 129 |
| Example I-5 | C-I-5 | 158 | 149 | 129 | 120 |
| Comparative Example I-1 | DC-I-1 | 150 | 110 | 126 | 107 |
| Comparative Example I-2 | DC-I-2 | 86 | 76 | 80 | 72 |
| Comparative Example I-6 | DC-I-6 | 100 | 93 | 100 | 93 |

As can be seen from the data of Table I-4, the hydrogenation catalyst of the present application shows higher desulfurization and denitrification activities, and higher stability of activity, as compared to the catalysts of the comparative examples.

Example II-1

This example was provided to illustrate the hydrogenation catalyst and the method for its preparation of the present application.

5000 mL of an aluminum sulfate solution having a concentration of 60 g/l of alumina and comprising 6.0 g of ribitol and 8.0 mL of 85 wt % concentrated phosphoric acid was added together with an aqueous ammonia solution with a concentration of 6 wt % into a 2-liter reaction tank in a concurrent flow mode for precipitation reaction, at a reaction temperature of 50° C. for 30 minutes, wherein the flow rate of the aqueous ammonia solution was controlled to obtain a pH of the reaction system of 5.0. After the precipitation reaction was completed, an appropriate amount of ammonia water was added into the slurry to obtain a pH of the slurry of 8.7, the slurry was aged at 70° C. for 120 min and filtered, the filter cake was slurried and washed with deionized water for 2 times, the filter cake was dried at 120° C. for 24 hr, to obtain a hydrated alumina PA-II-1, which has a pseudo-boehmite structure as determined by XRD characterization.

The h-value of PA-II-1 calculated based on the XRD characterization is shown in Table II-1. The relative crystallinity and $P_2O_5$ content of PA-II-1 are also shown in Table II-1.

140 g of PA-II-1 and 3 g of sesbania powder were taken, mixed with 110 ml of a mixed aqueous ammonium molybdate solution containing 249 g/l of $MoO_3$, 59 g/l of NiO, and 60 g/l of phosphoric acid and 30 ml of 2 wt % nitric acid solution to a volume of 140 ml and kneaded, then shaped by screw extrusion using a strip extruder, dried at 110° C. for 4 hours, and calcined at 700° C. for 3 hours to obtain a hydrogenation catalyst C-II-1. The measured value S obtained from the $H_2$-TPR pattern of the hydrogenation catalyst and the content of metal oxides thereof are shown in Table II-2.

Example II-2

A hydrogenation catalyst was prepared as described in Example II-1, except that: in the aluminum sulfate solution used, only 8.0 mL of phosphoric acid having a concentration of 85 wt % was added, while no ribitol was comprised, to obtain a hydrated alumina PA-II-2. PA-II-2 has a pseudo-boehmite structure as determined by XRD characterization as described in Example II-1, and the h-value of PA-II-2 calculated based on the XRD characterization is shown in Table II-1, and the relative crystallinity and $P_2O_5$ content thereof are also shown in Table II-1.

Example II-3

A hydrogenation catalyst was prepared as described in Example II-1, except that: the flow rate of the aqueous ammonia solution was directly controlled to obtain a pH value of the reaction system of 8.7, and after the precipitation reaction was completed, no ammonia water was added into the slurry to adjust the pH value, to obtain a hydrated alumina PA-II-3. PA-II-3 has a pseudo-boehmite structure as determined by XRD characterization as described in Example II-1, and the h-value of PA-II-3 calculated based on the XRD characterization is shown in Table II-1, and the relative crystallinity and $P_2O_5$ content thereof are also shown in Table II-1.

Example II-4

This example was provided to illustrate the hydrogenation catalyst and the method for its preparation of the present application.

4000 mL of an aluminum trichloride solution having a concentration of 45 g/l of alumina and comprising 22.1 mL of 85 wt % concentrated phosphoric acid and 4.52 g/l of sorbitol was added together with 1000 mL of a sodium metaaluminate solution having a concentration of 210 g/l of alumina and a caustic module of 1.58 in a concurrent flow mode to a 2-liter reaction tank to conduct a precipitation reaction at a reaction temperature of 80° C., the flow rate of the reactants was adjusted so that the pH value of the precipitation reaction was 4.0, and the reaction residence time was 15 minutes. Dilute ammonia water with a concentration of 5 wt % was added into the resulting slurry to adjust the pH value of the slurry to 9.0, the resultant was heated to 85° C., aged for 3 hours, then filtered using a vacuum filter. After the filtering, the filter cake was rinsed for about 30 minutes by adding thereinto 20 liters of deionized water (85° C.). The qualified filter cake obtained after washing was added into 3 liters of deionized water, stirred to obtain a slurry, the slurry was pumped into a spray dryer for drying, the temperature at the outlet of the spray dryer was controlled to be within a range of 100-110° C., and the material was dried for about 2 minutes to obtain a hydrated alumina PA-II-4. PA-II-4 has a pseudo-boehmite structure as determined by XRD characterization as described in Example II-1, and the h-value of PA-II-4 calculated based on the XRD characterization is shown in Table II-1, and the relative crystallinity and $P_2O_5$ content thereof are also shown in Table II-1.

110 ml of a mixed ammonium molybdate aqueous solution containing 434 g/l of $MoO_3$, 78 g/l of NiO, 80 g/l of citric acid was mixed with 35 ml of 1.9 wt % of nitric acid, then uniformly mixed with 140 g of PA-II-4, 3 g of sesbania powder and 2 g of hydroxypropyl methyl cellulose and kneaded, then shaped by screw extrusion using a strip extruder. The extrudates were dried for 4 hours at 110° C., and calcined for 3 hours at 680° C., to obtain a hydrogenation catalyst C-II-4. The measured value S obtained from the $H_2$-TPR pattern of the hydrogenation catalyst and the content of metal oxides thereof are shown in Table II-2.

Example II-5

This example was provided to illustrate the hydrogenation catalyst and the method for its preparation of the present application.

3000 mL of an aluminum sulfate solution having a concentration of 60 g/l of alumina and 4.5 g/l of gluconic acid and comprising 3.5 mL of 85 wt % concentrated phosphoric acid was added together with 1000 mL of a sodium metaaluminate solution having a concentration of 200 g/l of alumina and a caustic module of 1.58 in a concurrent flow mode into a 2-liter reaction tank to conduct a precipitation reaction at a reaction temperature of 55° C., the flow rate of the reactants was adjusted so that the pH value of the precipitation reaction was 6.5, and the reaction residence time was 15 minutes. Then, a sodium carbonate solution with a concentration of 100 g/l was added into the resulting slurry, to adjust the pH of the slurry to 9.5, the resultant was heated to 75° C., aged for 5 hr, and filtered using a vacuum filter, the filter cake was rinsed for about 30 minutes by adding thereinto 20 liters of deionized water (85° C.). The filter cake was dried for 24 hours at 120° C. to obtain a hydrated alumina PA-II-5. PA-II-5 has a pseudo-boehmite structure as determined by XRD characterization as described in Example II-1, and the h-value of PA-II-5 calculated based on the XRD characterization is shown in Table II-1, and the relative crystallinity and $P_2O_5$ content thereof are also shown in Table II-1.

114 g of PA-II-5, 2.5 g of sesbania powder, 16 g of $MoO_3$ and 3.8 g of NiO were taken, and those four dry powder materials were fully and uniformly mixed using a crusher, 115 ml of 3 wt % nitric acid solution was then added, and the resultant was kneaded, and shaped by screw extrusion using a strip extruder. The extrudates were dried at 120° C. for 3 hours, and calcined at 680° C. for 3 hours to obtain a hydrogenation catalyst C-II-5. The measured value S obtained from the $H_2$-TPR pattern of the hydrogenation catalyst and the content of metal oxides thereof are shown in Table II-2.

Comparative Example II-1

A hydrogenation catalyst was prepared as described in Example II-5, except that: the PA-II-5 was replaced with 300 g of dry alumina powder CPA-II-1 available from Changling Branch of Sinopec Catalyst Co., Ltd., which was uniformly mixed with 10 g sesbania powder to obtain a mixture, the mixture was mixed with 340 ml of an aqueous solution containing 7 g of nitric acid, further kneaded on a double-screw strip extruder to obtain a plastic body, then extruded into wet butterfly-shape extrudates with a diameter of 1.4 mm. The wet butterfly-shape extrudates were dried at 120° C. for 4 hours, and calcined at 600° C. for 4 hours to obtain a carrier DZ-II-1.

100 g of the carrier DZ-II-1 was impregnated with 110 ml of a mixed aqueous solution (comprising 249 g/l of $MoO_3$, 59 g/l of NiO and 78 g/l of phosphoric acid) composed of molybdenum oxide, basic nickel carbonate and phosphoric acid, and then dried at 120° C. for 4 hours and calcined at 400° C. for 3 hours to obtain a hydrogenation catalyst DC-II-1.

Example II-6

An experiment was carried out as described in Example II-5, except that: in the precipitation reaction, the flow rate of the reactants was adjusted so that the pH value of the precipitation reaction was 7, to obtain a hydrated alumina PA-II-6. PA-II-6 has a pseudo-boehmite structure as determined by XRD characterization as described in Example II-1, and the h-value of PA-II-6 calculated based on the XRD characterization is shown in Table II-1, and the relative crystallinity and $P_2O_5$ content thereof are also shown in Table II-1.

Example II-7

A hydrogenation catalyst was prepared as described in Example II-6, except that: the aluminum sulfate solution was free of gluconic acid, to obtain a hydrated alumina PA-II-7. PA-II-7 has a pseudo-boehmite structure as determined by XRD characterization as described in Example II-1, and the h-value of PA-II-7 calculated based on the XRD characterization is shown in Table II-1, and the relative crystallinity and $P_2O_5$ content thereof are also shown in Table II-1.

Example II-8

A hydrogenation catalyst was prepared as described in Example II-6, except that: the flow rate of the sodium metaaluminate solution was directly controlled to obtain a pH value of the reaction system of 9.5, and after the precipitation reaction was completed, no sodium carbonate solution was added into the slurry to adjust the pH value, to obtain a hydrated alumina PA-II-8. PA-II-8 has a pseudo-boehmite structure as determined by XRD characterization as described in Example II-1, and the h-value of PA-II-8 calculated based on the XRD characterization is shown in Table II-1, and the relative crystallinity and $P_2O_5$ content thereof are also shown in Table II-1.

Example II-9

This example was provided to illustrate the hydrogenation catalyst and the method for its preparation of the present application.

To a 2-liter three-neck flask equipped with a stirrer and a refluxing condenser, 1000 g of an isopropanol-water azeotrope (with a water content of 15 wt %), 4.6 mL of 85% concentrated phosphoric acid and 15 g of ribonic acid were added, ammonia water was added to adjust the pH to 5.1, and the resultant was heated to 60° C. 500 g of molten aluminum isopropoxide was slowly added dropwise into the flask through a separating funnel, reacted for 2 hours, adjusted to a pH of 8.5 by adding ammonia water, reacted under refluxing for 20 hours, and then half of the isopropanol was evaporated off. The resultant was aged at 80° C. for 6 hours, the rest of isopropanol was evaporated off during the aging, the aged hydrated alumina was filtered, and dried at 120° C. for 24 hours to obtain a hydrated alumina PA-II-9. PA-II-9 has a pseudo-boehmite structure as determined by XRD characterization as described in Example II-1, and the h-value of PA-II-9 calculated based on the XRD characterization is shown in Table II-1, and the relative crystallinity and $P_2O_5$ content thereof are also shown in Table II-1.

110 ml of a mixed aqueous solution containing 201 g/l of $MoO_3$, 40 g/l of CoO and 50 g/l of citric acid was formulated using molybdenum trioxide, basic cobalt carbonate and citric acid, kneaded with 140 g of PA-II-9 and 30 ml of 2 wt % of nitric acid, and then shaped by screw extrusion using a strip extruder. The extrudates were dried at 110° C. for 4 hours, and calcined at 650° C. for 3 hours to obtain a hydrogenation catalyst C-II-9. The measured value S obtained from the $H_2$-TPR pattern of the hydrogenation catalyst and the content of metal oxides thereof are shown in Table II-2.

Example II-10

This example was provided to illustrate the hydrogenation catalyst and the method for its preparation of the present application.

To a 2-liter three-neck flask equipped with a stirrer and a refluxing condenser, 1000 g of an isopropanol-water azeotrope (with a water content of 15 wt %), 7.0 mL of 85% concentrated phosphoric acid and 12 g of ribonic acid were added, ammonia water was added to adjust the pH to 6.2, and the resultant was heated to 60° C. 500 g of molten aluminum isopropoxide was slowly added dropwise into the flask through a separating funnel, reacted for 5 hours, adjusted to a pH of 8.5 by adding ammonia water, reacted under refluxing for 20 hours, and then half of the isopropanol was evaporated off. The resultant was aged at 80° C. for 6 hours, the rest of isopropanol was evaporated off during the aging, the aged hydrated alumina was filtered, and dried at 120° C. for 24 hours to obtain a hydrated alumina PA-II-10. PA-II-10 has a pseudo-boehmite structure as determined by XRD characterization as described in Example II-1, and the h-value of PA-II-10 calculated based on the XRD characterization is shown in Table II-1, and the relative crystallinity and $P_2O_5$ content thereof are also shown in Table II-1.

110 ml of a mixed aqueous solution containing 183 g/l of $MoO_3$ and 44 g/l of NiO was formulated using ammonium metatungstate and nickel nitrate, uniformly mixed with 140 g of PA-II-10, 30 ml of 1.9 wt % nitric acid, 3 g of sesbania powder and 2 g of hydroxypropyl methyl cellulose and kneaded, then shaped by screw extrusion using a strip extruder. The extrudates were dried at 110° C. for 4 hours, and calcined at 700° C. for 3 hours to obtain a hydrogenation catalyst C-II-10. The measured value S obtained from the $H_2$-TPR pattern of the hydrogenation catalyst and the content of metal oxides thereof are shown in Table II-2.

Example II-11

A hydrogenation catalyst was prepared as described in Example II-10, except that 110 ml of a mixed aqueous solution comprising 291 g/l of $MoO_3$, 74 g/l of NiO, and 50 g/l of phosphoric acid was formulated using molybdenum trioxide, basic nickel carbonate, basic cobalt carbonate and phosphoric acid, kneaded with 140 g of PA-II-10, 32 ml of 2 wt % nitric acid, and 2 g of sesbania powder, and then shaped by screw extrusion using a strip extruder. The extrudate was dried at 120° C. for 4 hours and calcined at 700° C. for 3 hours, to obtain a hydrogenation catalyst C-II-11.

Example II-12

A catalyst was prepared as described in Example II-11, except that the calcining was carried out at 750° C.

Example II-13

A catalyst was prepared as described in Example 15-11 except that the calcining was carried out at 800° C.

Example II-14

A catalyst was prepared as described in Example 25-11, except that the calcining was carried out at 560° C.

TABLE II-1

Properties of pseudo-boehmite involved in each example and comparative example

| Example No. | Sample name | D(020), nm | D(031), nm | Relative crystallinity, % | h value | $P_2O_5$ content, wt % |
|---|---|---|---|---|---|---|
| Example II-1 | PA-II-1 | 2.4 | 5.7 | 65 | 2.37 | 3 |
| Example II-2 | PA-II-2 | 3.3 | 5.1 | 69 | 1.55 | 3 |
| Example II-3 | PA-II-3 | 3.4 | 4.2 | 71 | 1.24 | 3 |
| Example II-4 | PA-II-4 | 2.2 | 5.6 | 67 | 2.55 | 6 |
| Example II-5 | PA-II-5 | 2.3 | 6.6 | 66 | 2.87 | 1 |
| Comparative Example II-1 | CPA-II-1 | 2.5 | 3.0 | 80 | 1.19 | 0 |
| Example II-6 | PA-II-6 | 2.2 | 5.0 | 65 | 2.27 | 1 |
| Example II-7 | PA-II-7 | 4.3 | 4.2 | 71 | 0.98 | 1 |
| Example II-8 | PA-II-8 | 3.2 | 3.1 | 73 | 0.97 | 1 |
| Example II-9 | PA-II-9 | 2.2 | 4.3 | 69 | 1.95 | 2 |
| Example II-10 | PA-II-10 | 3.4 | 6.4 | 77 | 1.88 | 3 |
| Example II-11 | PA-II-10 | 3.4 | 6.4 | 77 | 1.88 | 3 |
| Example II-12 | PA-II-10 | 3.4 | 6.4 | 77 | 1.88 | 3 |
| Example II-13 | PA-II-10 | 3.4 | 6.4 | 77 | 1.88 | 3 |
| Example II-14 | PA-II-10 | 3.4 | 6.4 | 77 | 1.88 | 3 |

TABLE II-2

Properties of the hydrogenation catalysts obtained in the examples and comparative examples

| Example No. | Pseudo-boehmite name | Catalyst name | $S(P_{low\text{-}temp\ peak}/P_{hi\text{-}temp\ peak})$ | Content of metal oxides, wt % | | | |
|---|---|---|---|---|---|---|---|
| | | | | $WO_3$ | $MoO_3$ | NiO | CoO |
| Example II-1 | PA-II-1 | C-II-1 | 1.04 | / | 18 | 4.3 | / |
| Example II-2 | PA-II-2 | C-II-2 | 1.12 | / | 18 | 4.3 | / |
| Example II-3 | PA-II-3 | C-II-3 | 1.11 | / | 18 | 4.3 | / |
| Example II-4 | PA-II-4 | C-II-4 | 1.10 | | 28 | 5 | / |
| Example II-5 | PA-II-5 | C-II-5 | 1.12 | / | 16 | 3.8 | / |
| Comparative Example II-1 | CPA-II-1 | DC-II-1 | 2.55 | / | 18 | 4.3 | / |
| Example II-6 | PA-II-6 | C-II-6 | 1.01 | / | 16 | 3.8 | / |

TABLE II-2-continued

Properties of the hydrogenation catalysts obtained in the examples and comparative examples

| Example No. | Pseudo-boehmite name | Catalyst name | $S(P_{low\text{-}temp\ peak}/P_{hi\text{-}temp\ peak})$ | Content of metal oxides, wt % | | | |
|---|---|---|---|---|---|---|---|
| | | | | WO$_3$ | MoO$_3$ | NiO | CoO |
| Example II-7 | PA-II-7 | C-II-7 | 1.15 | / | 16 | 3.8 | / |
| Example II-8 | PA-II-8 | C-II-8 | 1.12 | / | 16 | 3.8 | / |
| Example II-9 | PA-II-9 | C-II-9 | 1.02 | / | 12.5 | / | 2.5 |
| Example II-10 | PA-II-10 | C-II-10 | 0.98 | | 14.5 | 3.5 | / |
| Example II-11 | PA-II-10 | C-II-11 | 0.97 | / | 22 | 5.6 | |
| Example II-12 | PA-II-10 | C-II-12 | 1.62 | / | 22 | 5.6 | |
| Example II-13 | PA-II-10 | C-II-13 | 1.09 | / | 22 | 5.6 | |
| Example II-14 | PA-II-10 | C-II-14 | 0.5 | / | 22 | 5.6 | |

As can be seen from the results in Table II-1, the phosphorus-containing pseudo-boehmite prepared using the method of the present application has the characteristic of 1.7≤h≤3, preferably 2.2≤h≤2.8, while the pseudo-boehmite prepared using a method other than that of the present application all have a h value of less than 1.7.

As can be seen from the results of Table II-2, the hydrogenation catalyst according to the present application shows an H$_2$-TPR pattern with a measured value S in a range of 0.5-2.0, preferably in a range of 0.8-1.8, whereas the S value of the catalysts of the comparative examples typically falls out of this range.

Test Example II-1

The hydrogenation catalysts of Examples II-1 to II-14 and Comparative Example II-1 above were crushed to particles having a diameter of 2-3 mm and presulfurized under conditions including: a sulfurized oil of Qilu kerosene distillate containing 5 wt % of dimethyl disulfide, a liquid hourly volume space velocity of the sulfurized oil of 1.2 h$^{-1}$, a hydrogen partial pressure of 14.0 MPa, a hydrogen-to-oil volume ratio of 400, and a sulfurization carried out for 3 hours at a constant temperature of 360° C.; and the evaluation was then carried out in a fixed-bed reactor (with a catalyst loading amount of 100 ml).

Inferior atmospheric residue from the atmospheric and vacuum distillation unit of Sinopec Qilu petrochemical was taken as a feedstock (having a sulfur content of 2.11 wt %, a nitrogen content of 0.78 wt %, a carbon residue value of 8.3 wt %, a nickel content of 22 µg/g, and a vanadium content of 18 µg/g), and the catalyst was evaluated on a 100 ml small fixed bed reactor with a catalyst loading amount of 100 ml. The reaction conditions were as follows: a reaction temperature of 380° C., a hydrogen partial pressure of 15 MPa, a liquid hourly space velocity of 0.6 h$^{-1}$, and a hydrogen-to-oil volume ratio of 600. Referring to Test Example I-1, after 100 hours and 1000 hours of reaction, the products were tested for the (Ni+V) removal rate, desulfurization rate, carbon residue removal rate and denitrification rate, and the results are shown in Table II-3.

TABLE II-3

Test results of Test Example II-1

| Example No. | Catalyst name | (Ni + V) removal rate, % | | Desulfurization rate, % | | Carbon residue removal rate, % | | Denitrification rate, % | |
|---|---|---|---|---|---|---|---|---|---|
| | | 100 h | 1000 h | 100 h | 1000 h | 100 h | 1000 h | 100 h | 1000 h |
| Example II-1 | C-II-1 | 75 | 72 | 85 | 82 | 58 | 55 | 30 | 27 |
| Example II-2 | C-II-2 | 72 | 69 | 82 | 79 | 56 | 53 | 29 | 26 |
| Example II-3 | C-II-3 | 71 | 68 | 83 | 80 | 57 | 54 | 28 | 25 |
| Example II-4 | C-II-4 | 75 | 72 | 85 | 82 | 59 | 56 | 30 | 27 |
| Example II-5 | C-II-5 | 75 | 72 | 84 | 81 | 57 | 54 | 29 | 26 |
| Comparative Example II-1 | DC-II-1 | 72 | 60 | 83 | 70 | 56 | 43 | 28 | 18 |
| Example II-6 | C-II-6 | 74 | 71 | 83 | 80 | 57 | 54 | 28 | 24 |
| Example II-7 | C-II-7 | 72 | 69 | 81 | 78 | 56 | 50 | 28 | 23 |
| Example II-8 | C-II-8 | 71 | 68 | 82 | 79 | 57 | 54 | 27 | 24 |
| Example II-9 | C-II-9 | 78 | 75 | 85 | 82 | 59 | 56 | 28 | 25 |
| Example II-10 | C-II-10 | 74 | 71 | 84 | 81 | 58 | 55 | 29 | 26 |
| Example II-11 | C-II-11 | 74 | 71 | 83 | 80 | 57 | 54 | 29 | 26 |
| Example II-12 | C-II-12 | 73 | 70 | 82 | 79 | 56 | 53 | 28 | 25 |
| Example II-13 | C-II-13 | 69 | 67 | 79 | 75 | 54 | 49 | 27 | 24 |
| Example II-14 | C-II-14 | 70 | 67 | 80 | 76 | 54 | 51 | 28 | 25 |

As can be seen from the results of Table II-3, the hydrogenation catalyst of the present application shows excellent demetallization, desulfurization, and carbon residue removing activities and better stability of activity, as compared to the hydrogenation catalysts of the comparative examples.

Compared with the prior art, the catalyst of the present application can be obtained by only one step of calcining at high temperature, and the production process of the catalyst is simple; and the catalyst shows better stability after being calcined at high temperature as in the preferred embodiment, which is beneficial to reducing the cost of the catalyst and improving the operation period of the catalyst, thereby being beneficial to improving the overall economic benefit of a refinery.

Preferred embodiments of the present application have been described in detail above, but the present application is not limited to the details of the above embodiments. Various modifications can be made to the technical solution of the present application within the inventive concept thereof, and those modifications should fall within the scope of the present application.

It should be noted that, various features described in the above-described embodiments may be combined in any suitable manner, where there is no confliction. To avoid unnecessary repetition, those possible combinations are not described in the present application.

In addition, various embodiments of the present application may also be combined arbitrarily, and those combinations should also be considered as a part of the present application, as long as they do not depart from the spirit of the present application.

The invention claimed is:

1. A hydrogenation catalyst, comprising a carrier and a hydrogenation active metal component supported on the carrier,
    wherein the hydrogenation active metal component comprises at least one Group VIB metal component and at least one Group VIII metal component, the carrier being composed of phosphorus-containing alumina,
    wherein the hydrogenation catalyst is obtained by a method comprising the steps of:
    1) contacting a solution of an inorganic aluminum-containing compound with an acid or alkali for a precipitation reaction, or contacting an organic aluminum-containing compound with water for a hydrolysis reaction, in the presence of a grain growth regulator and a phosphorus-containing compound at a pH of 4-7 to obtain a phosphorus-containing hydrated alumina;
    2) aging the phosphorus-containing hydrated alumina at a pH of 7-10.5 to obtain a phosphorus-containing pseudo-boehmite,
    3) loading a hydrogenation active metal component on the phosphorus-containing pseudo-boehmite to obtain a hydrogenation catalyst precursor, wherein the hydrogenation active metal component comprises at least one Group VIB metal component and at least one Group VIII metal component, and
    4) calcining the hydrogenation catalyst precursor to obtain the hydrogenation catalyst at a calcining temperature of 560-800° C. for 1-10 hours,
    wherein the catalyst comprises 30-99 wt % of the carrier, 0.5-50 wt % of the Group VIB metal component and, calculated as oxides, and 0.5-20 wt % of the Group VIII metal component, calculated as oxides, based on the total amount of the hydrogenation catalyst, and the carrier comprises 94-99 wt % of $Al_2O_3$ and 1-6 wt % of $P_2O_5$, calculated as oxides and based on a total weight of the carrier, and
    when the hydrogenation catalyst is measured using a hydrogen temperature programmed reduction method ($H_2$-TPR), the ratio of the peak height of the low-temperature reduction peak, $P_{low\text{-}temp\ peak}$, at a temperature of 300-500° C. to the peak height of the high-temperature reduction peak, $P_{hi\text{-}temp\ peak}$, at a temperature of 650-850° C., i.e. $S=P_{low\text{-}temp\ peak}/P_{hi\text{-}temp\ peak}$, is 1-1.9.

2. The hydrogenation catalyst according to claim 1, wherein:
    the Group VIB metal component has a distribution factor $\sigma_{VIB}(R)$ of 0.5-3.5; and
    the Group VIII metal component has a distribution factor $\sigma_{VIII}(R)$ of 0.5-3.5.

3. The hydrogenation catalyst according to claim 1, wherein the phosphorus-containing alumina shows an IR spectrum in which $(I_{3670}+I_{3580})/(I_{3770}+I_{3720})$ is 1.9-2.8; wherein $I_{3670}$ represents the height of the peak at 3670 $cm^{-1}$, $I_{3580}$ represents the height of the peak at 3580 $cm^{-1}$, $I_{3770}$ represents the height of the peak at 3770 $cm^{-1}$, and $I_{3720}$ represents the height of the peak at 3720 $cm^{-1}$.

4. The hydrogenation catalyst according to claim 3, wherein the phosphorus-containing pseudo-boehmite has an h value satisfying $1.7 \leq h \leq 3$, wherein h=D(031)/D(020), the D(031) represents a grain size of the crystal face represented by a (031) peak in the XRD pattern of the grain of the pseudo-boehmite, the D(020) represents a grain size of the crystal face represented by a (020) peak in the XRD pattern of the grain of the pseudo-boehmite, the (031) peak refers to a peak at a 2θ of 34-43° in the XRD pattern, and the (020) peak refers to a peak at a 2θ of 10-15° in the XRD pattern, $D=K\lambda/(B \cos \theta)$, wherein K is the Scherrer constant, λ is the diffraction wavelength of the target material, B is the half-peak width of the diffraction peak, and 2θ is the position of the diffraction peak.

5. The hydrogenation catalyst according to claim 1, wherein:
    the Group VIB metal component is Mo and/or W, and the Group VIII metal component is Co and/or Ni.

6. The hydrogenation catalyst according to claim 1, wherein the carrier comprises 95-98 wt % of $Al_2O_3$; and 2-5 wt % of $P_2O_5$, calculated as oxides and based on the total amount of the carrier.

7. The phosphorus-containing pseudo-boehmite according to claim 1, comprising 1-6 wt % of $P_2O_5$, calculated as oxide and based on the dry weight of the phosphorus-containing pseudo-boehmite,
    wherein the phosphorus-containing pseudo-boehmite has an h value satisfying $1.7 \leq h \leq 3$, wherein h=D(031)/D(020), the D(031) represents a grain size of the crystal face represented by a (031) peak in the XRD pattern of the grain of the pseudo-boehmite, the D(020) represents a grain size of the crystal face represented by a (020) peak in the XRD pattern of the grain of the pseudo-boehmite, the (031) peak refers to a peak at a 2θ of 34-43° in the XRD pattern, and the (020) peak refers to a peak at a 2θ of 10-15° in the XRD pattern, $D=K\lambda/(B \cos \theta)$, wherein K is the Scherrer constant, λ is the diffraction wavelength of the target material, B is the half-peak width of the diffraction peak, and 2θ is the position of the diffraction peak.

8. The phosphorus-containing pseudo-boehmite according to claim 7, comprising 2-5 wt % of $P_2O_5$, calculated as oxide and based on the dry weight of the phosphorus-containing pseudo-boehmite, and has an h value of $2.2 \leq h \leq 2.8$.

9. The method according to claim 1, wherein in step 1) the pH value is 4-6.5, and in step 2) the pH value is 7-10.5.

10. The method according to claim 9, wherein the conditions of the precipitation reaction include: a reaction temperature of 45-80° C., and a reaction time of 10-60 minutes; the conditions of the hydrolysis reaction include: a reaction temperature of 40-90° C., and a reaction time of 2-30 hr; the grain growth regulator is at least one selected from the group consisting of sorbitol, glucose, gluconic acid, gluconate, ribitol, ribonic acid, salt of ribonic acid, and sulfate; in the precipitation reaction, the grain growth regulator is used in an amount of 1.5-8.5 wt %, based on the weight of the inorganic aluminum-containing compound (calculated as alumina); in the hydrolysis reaction, the grain growth regulator is used in an amount of 1.5-8.5 wt %, based on the weight of the organic aluminum-containing compound (calculated as alumina); the aging conditions of step 2) include: an aging temperature of 55-90° C.; an aging time of 2-6 hours.

11. The method according to claim 1, wherein the precipitation reaction is carried out at 30-90° C. for 10-60 minutes, and the hydrolysis reaction is carried out at 40-90° C. for 2-30 hr.

12. The method according to claim 1, wherein
the grain growth regulator is at least one selected from the group consisting of polyhydric sugar alcohols, salts of corresponding carboxylic acids thereof, and sulfates;
in the precipitation reaction, the grain growth regulator is used in an amount of 1-10 wt %, based on the weight of the inorganic aluminum-containing compound (calculated as alumina); and
in the hydrolysis reaction, the grain growth regulator is used in an amount of 1-10 wt %, based on the weight of the organic aluminum-containing compound (calculated as alumina).

13. The method according to claim 1, wherein:
the phosphorus-containing compound is selected from phosphoric acid, ammonium phosphate, ammonium hydrogen phosphate, diammonium hydrogen phosphate, sodium phosphate, potassium phosphate, and combinations thereof; the phosphorus-containing compound is used in an amount such that $P_2O_5$ is present in the resulting pseudo-boehmite in an amount of 1-6 wt %, calculated as oxide and based on the dry weight of the phosphorus-containing pseudo-boehmite;
the inorganic aluminum-containing compound is selected from aluminum salts, aluminates, or combinations thereof;
the organic aluminum-containing compound is selected from aluminum alkoxides that can undergo a hydrolysis reaction with water to produce a precipitate of hydrated alumina;
the acid is selected from sulfuric acid, hydrochloric acid, nitric acid, carbonic acid, phosphoric acid, formic acid, acetic acid, citric acid, oxalic acid, and combinations thereof; and/or
the alkali is selected from sodium metaaluminate, potassium metaaluminate, sodium hydroxide, potassium hydroxide, ammonia water, and combinations thereof.

14. The method according to claim 1, wherein the aging conditions of step 2) include: an aging temperature of 50-95° C. and an aging time of 0.5-8 hours.

15. The method for preparing the hydrogenation catalyst according to claim 1, further comprising:
shaping and drying the phosphorus-containing pseudo-boehmite to obtain a shaped product, wherein no calcining is carried out after the drying; and
loading the hydrogenation active metal component on the shaped product by impregnating the shaped product from step A) with an impregnating solution comprising at least one Group VIB metal compound and at least one Group VIII metal compound, followed by drying, to obtain the hydrogenation catalyst precursor.

16. The method according to claim 15, wherein the Group VIB metal component is Mo, W, or a combination thereof, the Group VIII metal component is Co, Ni, or a combination thereof;
the hydrogenation active metal component is used in such an amount that, in the hydrogenation catalyst, the carrier is present in an amount of 30-99 wt %; the Group VIB metal component is present in an amount of 0.5-50 wt %, calculated as oxides; and the Group VIII metal component is present in an amount of 0.5-20 wt %, calculated as oxides, based on the total amount of the hydrogenation catalyst.

17. The method according to claim 1, further comprising loading the hydrogenation active metal component by mixing, shaping and drying the phosphorus-containing pseudo-boehmite and a precursor of the hydrogenation active metal component to obtain the hydrogenation catalyst precursor; and
said mixing the phosphorus-containing pseudo-boehmite with a precursor of the hydrogenation active metal component comprising kneading at least one Group VIB metal compound and at least one Group VIII metal compound with said phosphorus-containing pseudo-boehmite.

18. The method according to claim 17, wherein the precursor of the hydrogenation active metal component is at least one selected from the group consisting of salts, oxides, and hydroxides of the hydrogenation active metal component;
the precursor of the Group VIB metal component is at least one selected from the group consisting of molybdenum oxide, molybdate, paramolybdate, phosphomolybdate, tungsten oxide, and tungstate, and
the precursor of the Group VIII metal component is at least one selected from the group consisting of cobalt nitrate, cobalt acetate, basic cobalt carbonate, cobalt chloride, and nitrate, chloride, formate, acetate, phosphate, citrate, oxalate, carbonate, basic carbonate, hydroxide, phosphide, sulfide, aluminate, and oxide of nickel.

19. A method for hydrogenation of hydrocarbon oils, comprising contacting a hydrocarbon oil with the hydrogenation catalyst of claim 1 under hydrogenation conditions.

20. The hydrogenation catalyst according to claim 1, wherein S is 1.0-1.8, the Group VIB metal component has a distribution factor $\sigma VIB(R)$ of 0.8-3; the Group VIII metal component has a distribution factor $\sigma VIII(R)$ of 0.8-3; the phosphorus-containing alumina shows an IR spectrum in which $(I_{3670}+I_{3580})/(I_{3770}+I_{3720})$ is 2-2.7; the catalyst comprises 40-94 wt % of the carrier, 5-45 wt % of the Group VIB metal component, calculated as oxides, and 1-15 wt % of the Group VIII metal component, calculated as oxides, based on the total amount of the hydrogenation catalyst.

* * * * *